(12) United States Patent
Kuwa et al.

(10) Patent No.: US 7,833,557 B2
(45) Date of Patent: Nov. 16, 2010

(54) METHOD OF IMPREGNATION TREATMENT FOR FOODS AND A VITAMIN C-CONTAINING EGG OBTAINED THEREBY

(75) Inventors: Munehiko Kuwa, Fussa (JP); Soichiro Kuwa, Fussa (JP); Kiyoshi Yamano, Fussa (JP)

(73) Assignee: Meiji Seika Kaisha, Ltd., Tokyo-To (JP)

( * ) Notice: Subject to any disclaimer, the term of this patent is extended or adjusted under 35 U.S.C. 154(b) by 927 days.

(21) Appl. No.: 11/599,558

(22) Filed: Nov. 14, 2006

(65) Prior Publication Data

US 2007/0059411 A1    Mar. 15, 2007

Related U.S. Application Data

(63) Continuation of application No. 10/220,213, filed as application No. PCT/JP01/01456 on Feb. 27, 2001, now Pat. No. 7,166,314.

(30) Foreign Application Priority Data

| Feb. 29, 2000 | (JP) | ................................. 2000-53709 |
| Jun. 29, 2000 | (JP) | ............................... 2000-196739 |
| Jan. 15, 2001 | (JP) | .................................. 2001-6968 |

(51) Int. Cl.
*A23L 3/00* (2006.01)
*A23L 1/32* (2006.01)

(52) U.S. Cl. ........................ 426/238; 426/614; 426/240; 426/241; 426/298; 426/300; 426/442; 426/444

(58) Field of Classification Search ................. 426/238, 426/240, 241, 300, 442, 444, 614
See application file for complete search history.

(56) References Cited

U.S. PATENT DOCUMENTS

| 3,526,511 | A | 9/1970 | Rockland |
| 3,758,226 | A | 9/1973 | Gyurech |
| 3,758,256 | A | 9/1973 | Terada |
| 4,018,908 | A | 4/1977 | Gross |
| 4,143,167 | A | 3/1979 | Blanchaud et al. |
| 4,218,484 | A | 8/1980 | Blanchaud et al. |
| 4,460,610 | A | 7/1984 | Macfie, Jr. |
| 4,557,937 | A | 12/1985 | Bournier |
| 4,735,813 | A | 4/1988 | Spinoglio |
| 4,834,997 | A | 5/1989 | Howard |
| 5,431,939 | A | 7/1995 | Cox et al. |
| 5,498,432 | A | 3/1996 | Leu |
| 5,939,112 | A | 8/1999 | Katayama et al. |
| 7,166,314 | B2 * | 1/2007 | Kuwa et al. ................. 426/240 |

FOREIGN PATENT DOCUMENTS

| CN | 1090722 |   | 8/1994 |
| JP | 48-36371 | A | 5/1973 |
| JP | 52-051066 | A | 4/1977 |
| JP | 52-117468 | A | 10/1977 |
| JP | 53-86050 | A | 7/1978 |
| JP | 59-162854 | * | 9/1984 |
| JP | 59-162854 | A | 9/1984 |
| JP | 61-015665 | A | 1/1986 |
| JP | 61-128864 | A | 6/1986 |
| JP | 62-208244 | A | 9/1987 |
| JP | 02-084131 | * | 3/1990 |
| JP | 02-084131 | A | 3/1990 |
| JP | 02-257858 | A | 10/1990 |
| JP | 04-190748 | A | 7/1992 |
| JP | 04-287665 | A | 10/1992 |
| JP | 06-205638 | A | 7/1994 |
| JP | 7050984 | A | 2/1995 |
| JP | 07-067582 |   | 3/1995 |
| JP | 07-067582 | A | 3/1995 |
| JP | 07067582 | * | 3/1995 |
| JP | 7-112453 | B2 | 5/1995 |
| WO | WO 95/18537 | * | 7/1995 |
| WO | WO 95/18537 | A1 | 7/1995 |

* cited by examiner

*Primary Examiner*—Carolyn A Paden
(74) *Attorney, Agent, or Firm*—The Webb Law Firm

(57) ABSTRACT

The method of impregnation treatment for foods comprises impregnating the foods with a liquid component or a gas component by contacting the foods with the liquid component or the gas component after vacuum treatment or in the vacuum state and/or cooling the foods in contact with the liquid component. The method of impregnation treatment for foods of the present invention enables readily impregnating various kinds of foods with various liquid components or gas components. The invention also provides a vitamin C-containing egg and a pidan-like egg.

24 Claims, 11 Drawing Sheets

US 7,833,557 B2

METHOD OF IMPREGNATION TREATMENT FOR FOODS AND A VITAMIN C-CONTAINING EGG OBTAINED THEREBY

CROSS-REFERENCE TO RELATED APPLICATION(S)

This application is a continuation of U.S. patent application Ser. No. 10/220,213 filed Aug. 28, 2002, now U.S. Pat. No. 7,166,314 which is the national phase of PCT/JP01/01456 filed Feb. 27, 2001.

BACKGROUND OF THE INVENTION

1. Field of the Invention

The present invention relates to a method of impregnation treatment for foods by which foods are impregnated with a liquid component or a gas component.

The present invention also relates to a method for obtaining vitamin C-containing eggs by impregnating eggs with a vitamin C component, and a method for obtaining pidan-like eggs by impregnating eggs with an alkali component.

2. Description of the Prior Art

There are a variety of foods known as impregnated with seasonings or the like. These foods are obtained by such a cooking method as boiling foods, such as vegetables, meats and fishes, in hot water containing seasonings, or soaking the foods in seasonings.

However, boiling of foods often results in hardened or softened foods due to the heat and inevitably causes the foods to have a different eating texture from that before the heating. Also, boiling of foods requires a long time to complete sufficient impregnation of the foods with seasonings, and it necessitates a large amount of heat energy to conduct the heating.

To shorten the time required to flavor foods by boiling, JP-B-7(1995)/112453 proposes a flavoring method by preparation in a depressurized cooker, in which a cooker containing cooking ingredients and seasoning components is depressurized to impregnate the ingredients with the flavor quickly into the inside. However, this method only achieves, when water-rich ingredients are depressurized as being soaked in a seasoning liquid, the substitution of the moisture in the ingredients with the seasoning liquid due to the difference of osmotic pressures, and remains unsatisfactory in terms of shortening of the flavoring time.

Meanwhile, soaking of foods in seasonings, although allowing foods to be impregnated with seasonings at ordinary temperature or low temperatures, requires a further longer time to complete deep impregnation of the foods with seasonings than by the boiling method.

In order to impregnate foods with liquids by a method other than these conventional cooking methods, it has been proposed (in JP-A-4(1992)/287665) that beef can be injected with a liquid and massaged to disperse the liquid in the tissues. This method, however, has problems that the uniform dispersion of the liquid in the tissues is difficult to attain and that the massage may destroy the tissues. Furthermore, such a method, inconveniently, cannot be applied to foods lacking in flexibility.

Also, JP-A-6(1994)/205638 proposes a method for preventing oxidation in production of pickles, in which a container containing pickles is depressurized to pressurize the pickles inside the container by the pressure difference, thereby creating a state where the pickles are being pressed by a weight, and simultaneously the oxygen around the pickles is removed to prevent oxidation. This method, which produces pickles in a so-called vacuum-packed state, is almost at the same level in terms of impregnation effects as that using a weight, and needs a long time for impregnation with seasonings.

As such, a simple method for impregnating foods with a liquid component in a short time is strongly demanded.

Moreover, it has been conventional to substitute a gas in a preservative environment for foods, which is air typically, with other gas; for example, preserving foods in packages filled with nitrogen. It has been unknown, however, to impregnate foods with a gas by substituting a gas or a liquid in the food tissues with other gas.

Meanwhile, eggs, such as chicken eggs and quail's eggs, are known to contain well-balanced nutritive components, such as proteins, lipids and minerals, and to be high in nutritional value among other foods. Eggs contain most of essential nutrients for humans except vitamin C. Therefore, the appearance of vitamin C-containing eggs is desired.

Examples of unshelled eggs (eggs with eggshells) known as impregnated with nutritive components, seasonings and other components include smoked eggs, which are prepared by boiling unshelled eggs and smoking them, and pidans, which are prepared by soaking eggs in a strongly alkaline paste to denature the proteins in the eggs into a gelled state. Also known are nutritionally enriched eggs produced by chickens or the like that have been fed with feedstuffs nutritionally enriched by, for example, iodine and fatty acids.

However, no eggs have been obtained as being enriched in vitamin C, the missing nutrient, and production of vitamin C-containing eggs by feeding chickens or the like with feedstuffs enriched in vitamin C has not been realized because, in such cases, the vitamin C in the feedstuffs is rarely transferred to the eggs.

It has been concerned, even if the vitamin C is successfully added in the eggs, that the eggs will have a destroyed flavor due to the strong acid taste of ascorbic acid.

On the other hand, pidans are a traditional Chinese food produced by processing duck eggs or the like as ingredients, and are widely known today as a food high in nutritional value and excellent in preservative quality. The pidans generally consist of a brown, gel-like albumen having transparency and a dark-green, soft-boiled or hard-boiled conditions of egg yolk, and have a sulfurous or ammonia smell.

The pidans can be prepared by, for example, soaking ingredient eggs in a strongly alkaline liquid containing salt for about 1 to 3 months, coating the resulting eggs with clay or mud and then with hull chaffs, and leaving the eggs at rest for about a half-month to 1 month. It is also known that the pidans can be prepared by coating ingredient eggs thickly with a clay-like mixture of sodium carbonate, peat mosses, salt, limestone, water, etc, coating the outside of eggs with hull chaffs, placing the eggs in a pot or a can, and leaving the eggs at rest in the sealed pot or can for about 3 to 6 months. It is also known that, in this production of the pidans, the color of pidans can be controlled by addition of a tea broth.

As mentioned above, the conventional pidans, although excellent in preservative quality, need 3 to 6 months, occasionally nearly 1 year for preparation. Accordingly, producers need to provide a place to store the pidans in preparation at rest over a long period of time.

Also, with the recent development of distribution and refrigerator storage technique, foods are required to have a short preparation time rather than excellent preservative quality.

Under these circumstances, there have been demanded a method for readily impregnating foods with a liquid component or a gas component in a short time, a method for efficiently impregnating eggs with vitamin C or a derivative thereof, and a method for producing pidan-like eggs by efficiently impregnating eggs with an alkali component.

The present inventors made an earnest study in light of such circumstances, and found that foods can be favorably impregnated in the tissues thereof with a liquid or a gas in a short period of time by vacuum treating the foods and contacting them with a liquid or a gas, or by cooling the foods in contact with a liquid component. The inventors also found that vitamin C-containing eggs and pidan-like eggs can be favorably prepared by the above method. The present invention has been completed with such findings.

SUMMARY OF THE INVENTION

The method of impregnation treatment for foods of the present invention comprises an impregnation step to impregnate foods with a liquid component or a gas component by contacting the foods with the liquid component or the gas component after a vacuum treatment or in a vacuum state and/or cooling the foods in contact with the liquid component.

It is also preferable that the impregnation step be a step in which the foods are vacuum treated, contacted with the liquid component in a maintained vacuum state and then subjected to pressurization, or a step in which the foods are contacted with the liquid component, vacuum treated and then subjected to pressurization, or a step in which the foods are vacuum treated and then subjected to pressurization with the impregnating gas component.

Preferably, the liquid component or the gas component contains a food additive component.

It is also preferable that the pressure in the vacuum treatment or in the vacuum state range from 10 to 50,000 Pa, that the impregnation step be conducted under a temperature condition of −20 to 180° C., and that the impregnation step be conducted with the use of a vacuum impregnating apparatus or a vacuum-pressure impregnating apparatus.

In the method of impregnation treatment for foods of the invention, an ultrasonic treatment or a microwave irradiation treatment is preferably performed during the impregnation treatment.

The foods are preferably selected from among cereals, meats, fishes, eggs, vegetables, fruits and processed foods. The foods are also preferably eggs, more preferably unshelled eggs.

In the method of impregnation treatment for foods, the impregnation step, when the foods are eggs, is preferably a step in which the eggs are contacted with a liquid component containing vitamin C or a derivative thereof to be impregnated with the vitamin C or the derivative thereof in an amount of 1 to 3,000 mg per 100 g of edible egg portions. In this case, the contact of the eggs with the liquid component containing vitamin C or a derivative thereof is preferably conducted at −5 to 130° C., more preferably 0 to 55° C. Likewise, it is preferable that the liquid component contain vitamin C or a derivative thereof and other food additive component. In the invention, vitamin C-containing eggs can be obtained by the above method.

In the method of impregnation treatment for foods, the impregnation step, when the foods are unshelled eggs, is preferably a step in which the eggs are contacted with a liquid component containing an alkali component to be impregnated in edible portions thereof with the liquid component. In this case, the liquid component preferably has pH of 12 to 15, and preferably contains an alkali component and a food additive component other than the alkali component. Also in this case, it is preferable that the impregnation step be a step in which the eggs are impregnated with the liquid component in an amount of 1 to 3,000 mg per 100 g of edible egg portions. Further in this case, the method preferably comprises a heating step to heat the eggs after the impregnation step. In the invention, pidan-like eggs having a transparent or translucent, gelled albumen can be obtained by the above method.

DETAILED DESCRIPTION OF THE INVENTION

Figure 1:
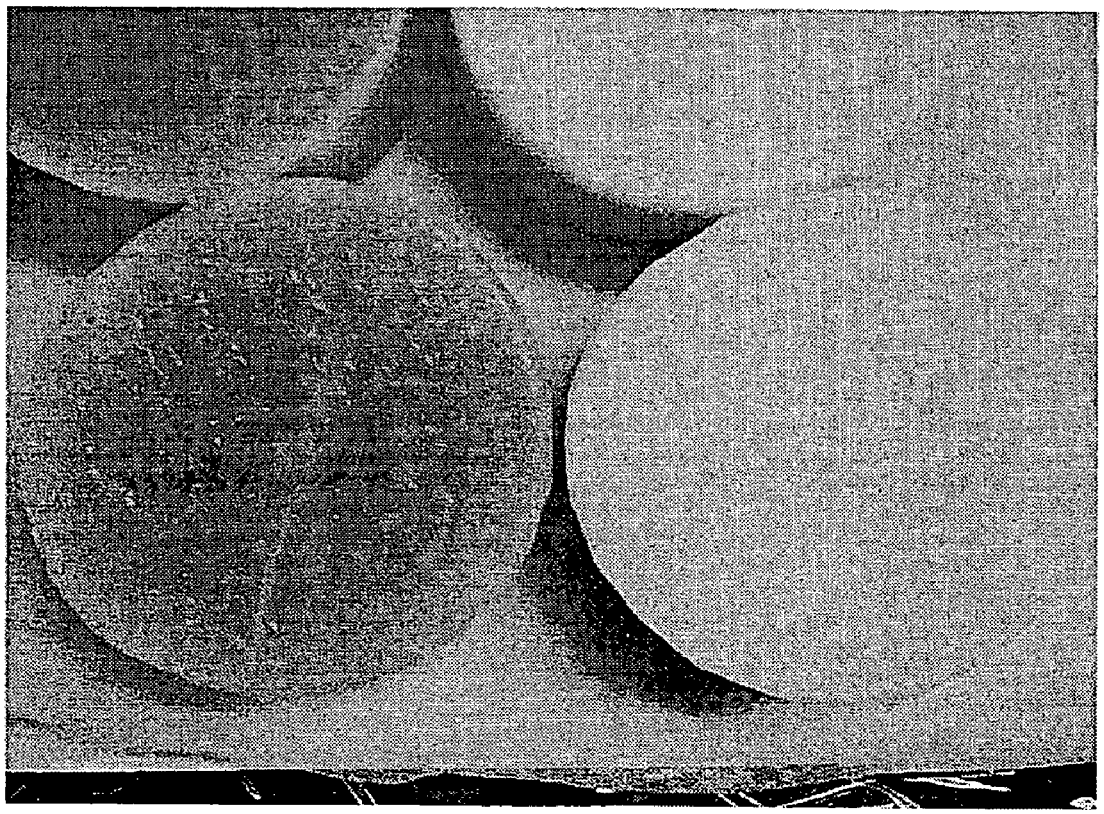
FIG. 1 is a picture of pieces of raw radish, showing the states before and after impregnation with a diluted soup base (impregnated pieces on the left) according to Example 4.

The present invention is illustrated in detail hereinafter.

The method of impregnation treatment for foods of the invention comprises an impregnation step of impregnating foods with a liquid component or a gas component.

Various kinds of foods can be subjected to the impregnation treatment of the invention without specific limitations. Examples of the foods employable in the invention include vegetables, such as leaf vegetables, root vegetables and mushrooms, fruits, cereals, beans, meats, fishes, skins, eggs, eggshells, bones, paste products, processed products thereof and livestock feedstuffs. Of these, preferably used are cereals, meats, fishes, vegetables, fruits and processed foods. These foods may be raw or have been appropriately cut, crushed, dried, heated or frozen when subjected to the impregnation treatment.

The above foods generally possess plenty of pores, air gaps or tubular tissues containing moisture, low volatile components or air inside thereof. In the invention, a liquid component or a gas component can be introduced in the foods by conducting impregnation that physically substitutes the moisture, low volatile components or air existing in the pores, air gaps or tubular tissues of the foods with a liquid component or a gas component to be introduced.

The method of impregnation treatment for foods of the present invention comprises an impregnation step to impregnate the foods with a liquid component or a gas component by contacting the foods with a liquid component or a gas component after a vacuum treatment or in a vacuum state and/or cooling the foods in contact with a liquid component.

That is, the impregnation step comprises, a first impregnation step to impregnate the foods with a liquid component by contacting the foods with a liquid component after a vacuum treatment or in a vacuum state, a second impregnation step to impregnate the foods with a gas component by contacting the foods with a gas component after a vacuum treatment or in a vacuum state, or a third impregnation step to impregnate the foods with a liquid component by cooling the foods in contact with a liquid component.

In the method, these steps are conducted singly or in combination.

Described first is the first impregnation step to impregnate the foods with a liquid component by contacting the foods with a liquid component after a vacuum treatment or in a vacuum state.

In the first and the later-described third impregnation steps to impregnate the foods with a liquid component, the impregnating liquid component may be any component that can be handled in a liquid state at the time of impregnation, such as liquids, solutions, slurries and dispersions.

For example, usable as the liquid component are the following components, which can be according to necessity dispersed or dissolved in a liquid. These liquid components may be used singly or in combination appropriately.

Examples of the components include liquids, such as water, alcohols, edible oils and chelate liquids; fermented seasonings, such as soy sauce and miso; food extraction components, such as fruit juices and meat juices; beverages, such as liquors, juices and teas; inorganic salts, such as sodium chloride, potassium chloride, calcium chloride, magnesium chloride and ferric chloride; alkali components, such as sodium hydroxide, potassium hydroxide, magnesium hydroxide and ammonia; essential inorganic elements, such as iodine; sweeteners, such as sucrose, fructose, glucose, starch syrup, honey, maple syrup and other natural and artificial sweeteners; acidulants, such as various vinegars, acetic acid, phosphoric acid, lactic acid, malic acid, citric acid, tartaric acid and gluconic acid; bitter components; spices and spice extraction components, such as peppers, red-peppers, mustard, wasabi, garlic and ginger; aroma chemicals; oily components; various enzymes and fermentative bacteria; moisturizers, such as glycerol, mirin, caseins and saccharides; preservatives, such as sorbic acid, benzoates, tannin and polyphenols; germicides, antibacterial agents, bacteriostatic agents; smoke components, such as pyroligneous acid and smoked-food oils; natural and synthetic pigments, colorants and color fixing agents; dietary fiber components, such as agar-agar and devil's tongue liquids; gelatin components, such as glues and gelatins; antioxidants, such as catechin and erythorbic acid; nutritional supplements, such as vitamins and amino acids; medicinal components and medical drugs; quality improvers, such as polyphosphates; and other food additive components.

The liquid component employable in the invention should be liquid at the time of impregnation. That is, ingredients, such as beef tallow, butter, chocolate and the like, which are solid at normal temperature but can be handled as a liquid by adjustment of impregnation conditions, e.g., temperature, also may be favorably used in the invention.

Of the liquid components mentioned above, particularly preferable are the liquid components and edible oils containing food additive components, such as seasonings. As mentioned later, liquid components containing vitamin C or a derivative thereof and liquid components containing an alkali component are suitably used when the foods for use in the invention are eggs.

In the first impregnation step, the foods are contacted with the liquid component after a vacuum treatment or in a vacuum state, so that the foods are impregnated with the liquid component.

To impregnate the foods with the liquid component, any method that conducts depressurization at least once during the course of impregnation of the foods with the liquid component can be employed. Preferably, the foods are contacted with the liquid component either after the vacuum treatment or in a vacuum state. Exemplary preferable methods of the impregnation include a method (A) in which the foods are vacuum treated (creating a dry vacuum), then contacted with the liquid component in a maintained vacuum state (creating a wet vacuum) and subjected to pressurization, thereby the foods are impregnated with the liquid component (such a method will be otherwise referred to as the "method (A)"), and a method (B) in which the foods are contacted with the liquid component, then vacuum treated (creating a wet vacuum) and subjected to pressurization, thereby the foods are impregnated with the liquid component (such a method will be otherwise referred to as the "method (B)").

In the first impregnation step, the foods may be contacted with the liquid component after the vacuum treatment, so that the foods are impregnated with the liquid component. There is no problem in leaving the vacuum-treated foods in normal pressure before its contact with the liquid component as long as, for example, the vacuum-treated foods are contacted with the liquid component as immediately as the vacuum state in the foods are maintained.

Described now is the method (A) in which the foods are vacuum treated (creating a dry vacuum), then contacted with the liquid component in a maintained vacuum state (creating a wet vacuum) and subjected to pressurization, thereby the foods are impregnated with the liquid component.

In the method (A), the step of vacuum treating the foods, in other wards, a so-called dry vacuum step of vacuum treating the foods without contact with the impregnating liquid component, the foods are placed in a pressure reducing apparatus and the vicinity of the foods can be depressurized to usually about 10 to 50,000 Pa, preferably about 100 to 10,000 Pa, particularly preferably about 100 to 5,000 Pa. This vacuum treatment eliminates the moisture, low volatile components or air contained in the pores, air gaps or tubular tissues of the foods, so that the pores, air gaps or tubular tissues of the foods are in a state as much depressurized as the vicinity of the foods. The pressure in the vacuum treatment can be appropriately controlled depending on the temperature condition and the desired impregnation degree.

In the step of vacuum treating the foods as above, the moisture, low volatile components or air contained in the foods are eliminated more effectively as the pressure decreases and the vacuum degree increases, so that high-level impregnation can be conducted. However, pressure conditions to enable sufficient elimination of the moisture or the like from the foods are different depending on the temperature. The vacuum degree may be relatively low at high temperatures and tends to need be high at low temperatures.

Next, the foods, while being kept in a vacuum state, are contacted with the liquid component. There is no specific limitation on the method of contacting the foods with the liquid component as long as the foods can be sufficiently contacted with the liquid component at portions thereof to be impregnated in a vacuum state. Exemplary methods include soaking. For example, in the case where a container keeping the foods therein is placed in a pressure reducing apparatus, the contact can be performed by injecting the liquid component in the container keeping the foods therein while maintaining the vacuum state created by the vacuum treatment.

The pressure condition in the vacuum treatment or in the vacuum state should be lower than atmospheric pressure. In the vacuum state, the pressure condition is preferably such that the vacuum degree created by the vacuum treatment is maintained as intact as possible. It is ideal that the pressure in the vacuum state be about 10 to 50,000 Pa, preferably about 100 to 10,000 Pa, particularly preferably about 1,000 to 10,000 Pa when the impregnating liquid component is water or a solution, and about 100 to 5,000 Pa when the impregnating liquid component is an oil or an oil solution.

The resulting foods, which have been vacuum treated and contacted with the liquid component in the maintained vacuum state, are then subjected to pressurization by pressurizing the pressure reducing apparatus, thereby the foods are impregnated with the liquid component. The pressurization is ideally conducted such that the surrounding pressure of the foods having been contacted with the liquid component rises to usually about 10,000 Pa to 1.1 MPa, preferably about 0.1 MPa (atmospheric pressure) to 0.9 MPa.

The pressurization can be usually conducted by, for example, releasing the vacuum state by air purging to raise the pressure to nearly atmospheric pressure (0.1 MPa), and can be further conducted. To raise the pressure beyond the atmospheric pressure, a pressurizer can be appropriately employed. For example, such pressurization can be conducted as follows. With the use of a pressure container as a container to be subjected to the vacuum treatment, the vacuum treatment is carried out, and, with the foods soaked in the liquid component, a gas such as air, nitrogen gas or carbon dioxide is introduced in the apparatus to raise the pressure to a desired level. In this case, heating can be simultaneously conducted when the pressurization is carried out by introducing water vapor or alcohol vapor.

The method (A) can favorably substitute, irrespective of whatsoever, a liquid component such as moisture or low volatile components or a gas component such as air contained in the pores, air gaps or tubular tissues of the unimpregnated foods with the impregnating liquid component, thereby favorably completing the impregnation treatment.

Described next is the method (B) in which the foods are contacted with the liquid component, then vacuum treated and subjected to pressurization, thereby the foods are impregnated with the liquid component.

In the method (B), performed first is a so-called wet vacuum step of vacuum treating the unimpregnated foods that have been contacted with the liquid component by soaking or the like. This step can be carried out by placing the foods and the liquid component in a container, thereby creating a state in which the foods are soaked in the liquid component, and introducing the container into a pressure reducing apparatus to conduct the vacuum treatment. In the vacuum treatment, ideally, the pressure condition is about 10 to 50,000 Pa, preferably about 100 to 10,000 Pa, particularly preferably about 1,000 to 10,000 Pa when the impregnating liquid component is water or a solution, and about 100 to 5,000 Pa when the impregnating liquid component is an oil or an oil solution. In the method (B), as described above, the foods are contacted with the liquid component in the vacuum state.

The resulting foods, which have been contacted with the liquid component, are then subjected to pressurization by pressurizing the pressure reducing apparatus, thereby the foods are impregnated with the liquid component. The pressurization is ideally conducted, likewise in the method (A), such that the surrounding pressure of the foods having been soaked in the liquid component rises to usually about 10,000 Pa to 1.1 MPa, preferably about 0.1 MPa to 0.9 MPa. The pressurization can be usually conducted by, for example, releasing the vacuum state to raise the pressure to nearly atmospheric pressure, and can be further conducted.

The method (B) is particularly preferable to achieve the impregnation of the foods with the liquid component when the unimpregnated foods have pores, air gaps or tubular tissues containing a gas component such as air. The method (B) is particularly preferable to achieve the impregnation of the foods with the liquid component also when the unimpregnated foods have pores, air gaps or tubular tissues containing a liquid component that has a boiling point lower than that of the impregnating liquid component.

For example, when fillets of meat or fish, which contain in the tissues thereof moisture or volatile components of low boiling point, are impregnated with an aqueous liquid component, such as salt water or soy sauce, or an oily component, such as oil or oily seasonings, the vacuum treatment is conducted to the extent such that the volatile components or moisture in the foods are boiled and the impregnating aqueous liquid component or oily component stays unboiled, thereby the volatile components or moisture are eliminated from the foods and the foods are favorably impregnated with the liquid component by the following pressurization.

It is particularly preferable that the impregnating liquid component be an oily component, such as oil or oily seasonings, because the state in which the moisture in the foods is boiled and the impregnating oily component remains unboiled can be readily created. Such a state can be readily created by adjusting vacuum conditions even when the foods are frozen foods or the like that require the impregnation treatment to be conducted at low temperatures, for example, temperatures lower than normal temperature. For example, when the impregnation treatment is performed in a state in which the moisture-containing foods are soaked in oil, it is observed that the moisture in the foods alone is boiled to create a tempura-cooking state, showing that the foods are favorably impregnated with the oil component.

In the above first impregnation step, the foods can be impregnated with the above-mentioned various kinds of components as a liquid component, so that flavoring, improvement of flavor and eating texture, sterilization and addition of medicinal components, nutritive components, colorants and other various additives can be attained.

Described next is the second impregnation step to impregnate the foods with a gas component by contacting the foods with a gas component after the vacuum treatment or in the vacuum state. In the second impregnation step, the foods are contacted with a gas component after the vacuum treatment or in the vacuum state to be impregnated with the gas component.

Examples of the gas component with which the foods are impregnated include gases obtained by evaporating a liquid, such as water vapor, alcohol vapor and volatile material vapor; gases containing aroma chemicals or other various additives; and other gases, such as oxygen, carbon dioxide, ethylene, nitrogen, noble gases and air. These gases can be used either individually or in combination appropriately.

Preferably, the contact of the foods with the gas component after the vacuum treatment or in the vacuum state is made in a pressure reducing apparatus containing the foods having been vacuum treated or in the vacuum state. Also preferably, the impregnating gas component is introduced in the pressure reducing apparatus. To introduce the impregnating gas component into the pressure reducing apparatus, for example, the gas can be directly introduced into the pressure reducing apparatus after the vacuum treatment, or a liquid can be introduced into the pressure reducing apparatus after the vacuum treatment and thereafter can be vaporized, or the foods and a liquid are placed in the pressure reducing apparatus without contact and the liquid can be vaporized by the vacuum treatment.

By these methods described above, the foods and the impregnating gas component can be favorably contacted with each other after the vacuum treatment or in the vacuum state. When a liquid is vaporized by the vacuum treatment to produce air and the foods are contacted with the air to be impregnated therewith, the liquid may have been appropriately heated.

To attain impregnation of the foods with the gas component in the second impregnation step, any method that conducts depressurization at least once during the course of impregnation of the foods with the gas component can be employed. Ideally, the foods are first vacuum treated and then subjected to pressurization with the impregnating gas component to be impregnated with the gas component.

In the method (B), likewise in the first impregnation step of the method (A), the step of vacuum treating the foods is conducted such that the foods are placed in a pressure reducing apparatus and the vicinity of the foods is depressurized to usually about 10 to 50,000 Pa, preferably about 100 to 10,000 Pa, particularly preferably about 100 to 5,000 Pa. In this case, the pressure reducing apparatus has been preferably purged with the impregnating gas component. This vacuum treatment eliminates the moisture, low volatile components or air contained in the pores, air gaps or tubular tissues of the foods, so that the pores, air gaps or tubular tissues of the foods are in a state as much depressurized as the vicinity of the foods. The pressure in the vacuum treatment can be appropriately controlled depending on the desired impregnation degree or the like. It is mentioned that the moisture, low volatile components or air contained in the foods are eliminated more effectively as the pressure decreases and the vacuum degree increases, so that high-level impregnation can be conducted.

Subsequently, the vicinity of the vacuum-treated foods is pressurized with the impregnating gas component, thereby the foods are impregnated with the gas component. The pressurization is ideally conducted such that the pressure reducing apparatus, in which the foods and the gas component have been contacted with each other, is pressurized with the gas component to a pressure condition of usually about 100 Pa to 2 MPa, preferably about 10,000 Pa to 1.1 MPa, particularly preferably about 0.1 to 0.9 MPa. The pressurization can be made by pressurizing the pressure reducing apparatus with the impregnating gas component to nearly atmospheric pressure, and can be further conducted.

The above method to impregnate the foods with the gas component can be used for various purposes, such as promoting fermentation of kimchi and pickles by impregnating them with enzyme, avoiding food-quality deterioration, such as oxidation, by impregnating the foods with an inert gas, such as nitrogen, controlling germination and promoting aging by introducing an ethylene gas, and substituting air inside the foods with a gas.

The method of impregnation treatment for foods of the invention that enables impregnating the foods with the liquid component or the gas component, may comprise a treatment to vibrate the foods, such as ultrasonic treatment, which is conducted during the impregnation treatment. The vibrating treatment, such as ultrasonic treatment, can be performed continuously over all the steps in the impregnation treatment, or in some of the steps. To conduct such a treatment in a stage of the vacuum treatment is preferable because the moisture, low volatile components or air contained in the foods can be more smoothly eliminated. It is also preferable to conduct the vibrating treatment, such as ultrasonic treatment, in a stage of the pressurization because the foods can be more smoothly impregnated with the liquid component or the gas component.

Described next is the third impregnation step to impregnate the foods with the liquid component by cooling the foods in contact with the liquid component.

The liquid component to impregnate the foods with in the third impregnation step can be, likewise in the first impregnation step, any component that can be handled in a liquid state at the time of impregnation, such as liquids, solutions, slurries and dispersions. Examples of the liquid component include the same ones as described with respect to the first impregnation step.

The following are exemplary preferable methods to impregnate the foods with the liquid component by cooling the foods in contact with the liquid component.

1. The foods, in a state of being soaked in the liquid component, are cooled by 5° C. or more, preferably 10° C. or more, thereby the foods are impregnated with the liquid component.

2. The foods are soaked in the liquid component, heated and, as being soaked in the liquid component, cooled to normal temperature or below, thereby the foods are impregnated with the liquid component.

3. The heated foods are soaked in the liquid component of a temperature lower than that of the foods to be cooled in contact with the liquid component, thereby the foods are impregnated with the liquid component.

In the third impregnation step, it is preferable that the temperature difference in the cooling be made large by heating and cooling of the foods at best temperatures within the limits preventing unintended denaturation of the foods. In such a case, the impregnation of the foods with the liquid component can be performed more preferably.

The third impregnation step, which can be applied to every kind of foods, is particularly effective when the foods have integuments on the surface, such as eggs with eggshells. For example, when eggs with eggshells are cooled in contact with the liquid component, the yolks, albumens and air-space gases in the eggshells are heat-shrunk by the temperature difference in the cooling but the eggshells itself are hardly heat-shrunk, thereby a vacuum state is created in the eggshells. Accordingly, it is presumed that the liquid component in contact with the eggshells impregnates inside the eggshells through the eggshell pores, thereby the eggs are favorably impregnated with the liquid component. It is therefore preferable that the temperature difference in the cooling be large. Ideally, the foods are cooled by usually 5° C. or more, preferably 10° C. or more, still preferably 20° C. or more. As mentioned in the above examples, heating prior to the cooling is preferable. When the eggs are heated as unshelled, the yolks, albumens and air-space gases in the eggshells are heat-swollen, so that the air and, occasionally, portion of the moisture contained inside the eggshells are discharged outside the eggshells. When such eggs are cooled in contact with the liquid component, components inside the eggshells are shrunk by a larger degree to enable efficiently impregnating the eggs with the liquid component.

In the third impregnation step with the cooling mentioned above, it is preferable to conduct pressurization after the cooling to impregnate the foods further effectively with the liquid component.

In the invention, the above impregnation steps can be carried out in combination appropriately.

It is needless to say that the liquid component or the gas component used in these impregnation steps may contain food-additive components other than those specified above.

There is no specific limitation on the temperature conditions in the impregnation steps of the present invention. The impregnation steps can be appropriately carried out under desired temperature conditions according to the types of the foods and the liquid component, and, ideally, are conducted at usually −20 to 180° C., preferably −10 to 150° C., particularly preferably −5 to 120° C.

When the impregnation step is a step of contacting the foods with the liquid component or the gas component after the vacuum treatment or in the vacuum state (the first and the second impregnation steps), the impregnation can be preferably attained with the use of a vacuum impregnating apparatus or a vacuum-pressure impregnating apparatus. Particularly, it is more preferable to perform the impregnation by the use of a vacuum-pressure impregnating apparatus because operation thereof is simple and, even if the pressurization is conducted by application of pressure, the treatment can be carried out smoothly.

In the method of impregnation treatment for foods of the invention, the impregnation treatment is preferably accompanied by heating, heat insulation or cooling, or a microwave irradiation treatment can be performed. The microwave irradiation treatment may be performed for the purpose of, for example, defrosting the frozen foods, heat insulation by avoiding lowering of temperature owing to removal of latent heat when the moisture is vaporized under vacuum, cooking, or sterilization. The microwave irradiation treatment can be performed continuously over all the steps in the impregnation treatment, or in some of the steps.

Also, in the method of impregnation treatment for foods according to the invention, stirring can be conducted during the impregnation treatment. Stirring during the impregnation treatment is preferable because the impregnation treatment can be effected more evenly. The stirring during the impregnation treatment is performed for the purpose of, for example, impregnating the foods evenly with the liquid component or the gas component, or, under vacuum conditions, evenly discharging the liquid component or the gas component contained in the foods from the piled foods. The stirring can be performed continuously over all the steps in the impregnation treatment, or in some of the steps.

In the method of impregnation treatment for foods of the invention, the foods may be pre-treated before the impregnation treatment. Examples of the pre-treatment include any treatments applicable to foods, such as cutting, freezing, defrosting, heating, drying, flavoring, stirring, pressurizing, depressurizing and drug-treating. In carrying out the present invention, it is preferable in view of good impregnation efficiency that the frozen foods be semi-defrosted or defrosted for use.

In the method of impregnation treatment for foods of the invention, an after-treatment may be performed for the foods after the impregnation treatment. Examples of the after-treatment include any treatments applicable to foods, such as cutting, freezing, defrosting, heating, drying, flavoring, stirring, pressurizing, depressurizing and drug-treating. Otherwise, the after-treatment may be a treatment that removes extra components of the impregnating components. For example, extra liquid components can be removed from the foods impregnated with the liquid component by drying or a dehydration treatment.

In the method of impregnation treatment for foods of the invention, the impregnation degree can be adjusted by controlling treatment conditions, such as vacuum degree or cooling degree, thereby the foods can be impregnated at a desired impregnation degree. For example, it is possible to produce the foods that have been impregnated evenly into the center part and the foods that have been impregnated only at the surface area. Specifically, when eggshells are to be sterilized and food surfaces to be colored, the foods can be impregnated only at the surface area by controlling the vacuum degree in the vacuum treatment.

According to the method of impregnation treatment for foods of the invention, the foods can be impregnated with the liquid component or the gas component in a very short period of time. Further, when the impregnation step is conducted such that the foods are contacted with the liquid component or the gas component after the vacuum treatment or in the vacuum state, the impregnation treatment can be performed at normal temperature without heating or cooling. Accordingly, even if the foods to be impregnated are perishable foods or the like, the foods can be impregnated without deteriorating its eating texture.

By the method of impregnation treatment for foods of the invention, various kinds of foods can be readily impregnated with various kinds of liquid components or gas components.

Moreover, the method of impregnation treatment for foods allows for obtaining vitamin C-containing eggs, which has never been realized. Described below is the method of impregnation treatment for foods to impregnate eggs with vitamin C or a derivative thereof (otherwise referred to as the method for preparing vitamin C-containing eggs hereinafter).

In the invention, eggs are contacted with a liquid component containing vitamin C or a derivative thereof (these will be otherwise referred to as the vitamin C component hereinafter), so that the eggs are impregnated with the vitamin C component in an amount of 1 to 3,000 mg, preferably 1 to 2,500 mg per 100 g of edible egg portions, thereby vitamin C-containing eggs are prepared.

Examples of the eggs preferably used in production of the vitamin C-containing eggs include chicken eggs, duck eggs and quail's eggs. The eggs may be unshelled eggs or heat-treated shelled eggs, ideally unshelled eggs. When the eggs are unshelled eggs, they may be raw or boiled. Particularly preferably, the eggs are unshelled raw eggs.

Examples of the vitamin C-component with which the eggs are impregnated include vitamin C (L-ascorbic acid) and derivatives thereof, such as ascorbic acid metallic salts. Particularly preferably, the vitamin C-component is sodium ascorbate. The liquid component used in the method for preparing vitamin C-containing eggs contains at least one vitamin C component selected from the above examples.

Examples of the liquid component containing the vitamin C component include liquid components prepared by dissolving or dispersing the vitamin C component in an edible liquid, such as water, alcohols, alcohol-containing water, edible oils, seasoning liquids, liquors and chelate liquids. Preferably, the liquid component is an aqueous solution containing at least one of the vitamin C components dissolved therein.

Ideally, the liquid component containing the vitamin C component has a concentration of the vitamin C component, which is not particularly limited thereto, of usually about 1 to 50% by weight, preferably about 5 to 30% by weight.

The liquid component containing the vitamin C component may further contain a food additive component other than vitamin C or the vitamin C derivative. That is, the liquid component containing the vitamin C component preferably used herein may be one prepared by dissolving or dispersing the vitamin C component in any of the liquid components exemplified as the liquid components with which the foods are impregnated in the first and the third impregnation steps.

Of the food additive components, the inorganic metallic elements may be used as salts of L-ascorbic acid. Such seasonings as L-glutamic acid, glycine, inosinic acid and sorbitol have an effect of inhibiting oxidation decomposition of the L-ascorbic acid, and therefore preferably used in combination with the vitamin C component.

In the method of preparing vitamin C-containing eggs of the invention, the eggs are contacted with the above-described liquid component containing the vitamin C component, thereby the eggs are impregnated with the vitamin C component. The contact of the eggs and the liquid component containing the vitamin C component can be made by such a method as, for example, soaking the eggs in the liquid component or spraying the liquid component on the eggs. The eggs are preferably soaked in the liquid component for contact because, in that way, the entire egg surface can be evenly contacted with the liquid component. Also, the contact of the eggs and the liquid component containing the vitamin C component may be conducted after the vacuum treatment of the eggs or in the vacuum state, and under normal pressure or under pressure.

To impregnate the eggs with the vitamin C component, any of the first impregnation step and the third impregnation step mentioned above to impregnate the foods with the liquid component can be employed. That is, the impregnation step may be conducted in a manner such that the eggs are contacted with the liquid component containing the vitamin C component after the vacuum treatment or in the vacuum state, or in a manner such that the eggs are cooled in contact with the liquid component containing the vitamin C component.

Specifically, the above impregnation step in which the eggs are contacted with the liquid component containing the vitamin C component after the vacuum treatment or in the vacuum state is, for example, a step in which the eggs are vacuum treated and, in the maintained vacuum state, contacted with the liquid component containing the vitamin C component and thereafter subjected to pressurization, or a step in which the eggs are contacted with the liquid component containing the vitamin C component, vacuum treated and thereafter subjected to pressurization. Specific operations in the above impregnation steps are as described above.

In the method for preparing vitamin C-containing eggs by the impregnation step with the vacuum treatment, gases in air spaces of the eggs are substituted with the liquid component, so that the impregnated eggs sometimes gain weight. In such a case, the air volume in the eggshells has been reduced. Accordingly, when the resulting vitamin C-containing eggs are raw and heated to give boiled eggs, it is frequent that the edible portions and the eggshells have a high sticking degree, which results in difficult shelling of the eggs. Therefore, in the method of preparing vitamin C-containing eggs, in which the eggs are contacted with the liquid component containing the vitamin C component after the vacuum treatment or in the vacuum state to be impregnated therewith, the eggs may be subjected to another vacuum treatment after the impregnation step in order to control a substantial increase of the egg weight.

In the above method of preparing vitamin C-containing eggs, in which the eggs are contacted with the liquid component containing the vitamin C component after the vacuum treatment or in the vacuum state to be impregnated therewith, the impregnation degree with the vitamin C component can be adjusted by controlling the vacuum degree or the like, thereby the eggs can be impregnated with a desired vitamin C content. Particularly, when the ingredients are boiled eggs, it is possible to produce the eggs that have been impregnated with vitamin C only in the albumens by controlling the vacuum degree in the vacuum treatment.

The following are exemplary preferable impregnation steps of cooling the eggs in contact with the liquid component containing the vitamin C component.

1. The raw or boiled eggs are soaked in the liquid component containing the vitamin C component and, in that state, cooled by 5° C. or more, preferably 10° C. or more, thereby the vitamin C-containing raw eggs are obtained.

2. The raw eggs are soaked in the liquid component containing the vitamin C component, heated to 75° C. or over to be boiled in the liquid component and, as being soaked in the liquid component, cooled to normal temperature or below, thereby the vitamin C-containing boiled eggs are obtained.

3. The raw eggs are brought into a boiled egg state by heating to 75° C. or over in water or steam and then cooled to normal temperature or below by soaking in the liquid component containing the vitamin C component, thereby the vitamin C-containing boiled eggs are obtained.

4. The raw eggs are soaked in the liquid component containing the vitamin C component, heated to 55° C. or below, preferably from 45 to 55° C. and then cooled to normal temperature or below, preferably from 0 to 10° C., thereby the vitamin C-containing raw eggs are obtained.

5. The raw eggs are heated to 55° C. or below, preferably from 45 to 55° C. in water or steam and soaked in the liquid component containing the vitamin C component to be cooled to normal temperature or below, preferably from 0 to 10° C., thereby the vitamin C-containing raw eggs are obtained.

When the unshelled eggs are cooled in contact with the liquid component containing vitamin C or the vitamin C derivative, the yolks, albumens and air-space gases in the eggshells are heat-shrunk by the temperature difference in the cooling but the eggshells itself are hardly heat-shrunk, so that a vacuum state is created in the eggshells. Accordingly, it is presumed that the liquid component containing the vitamin C component that is in contact with the eggshells impregnates inside the eggshells through the eggshell pores, thereby the eggs are favorably impregnated with the vitamin C component. It is therefore preferable that the temperature difference in the cooling be large. Ideally, the foods are cooled by usually 5° C. or more, preferably 10° C. or more, still preferably 20° C. or more.

As mentioned in the above examples, heating prior to the cooling is preferable. When the eggs are heated as unshelled, the yolks, albumens and air-space gases in the eggshells are heat-swollen, so that the air and, occasionally, portion of the moisture contained inside the eggshells are discharged outside the eggshells. When such eggs are cooled in contact with the liquid component containing the vitamin C component, components inside the eggshells are shrunk by a larger degree to enable efficiently impregnating the eggs with the vitamin C component.

In the method of preparing vitamin C-containing eggs with cooling, it is preferable to conduct pressurization after the cooling because the eggs can be further effectively impregnated with the vitamin C component.

Production of the vitamin C-containing eggs with cooling can be carried out in combination with the above vacuum treatment.

There is no specific limitation on the temperature conditions in the impregnation step to impregnate the eggs with the liquid component containing the vitamin C component. The temperature in the impregnation step is usually about −5 to 130° C. Particularly, when the eggs are raw before the impregnation and are to be produced into the raw vitamin C-containing eggs, the impregnation step is conducted under the temperature condition of 0 to 55° C.

In the case of preparing the vitamin C-containing eggs as well, the impregnation treatment may be accompanied by a vibrating treatment, such as ultrasonic treatment, heating, heat insulation, cooling or a microwave irradiation treatment. These treatments may be performed continuously over all the steps in the impregnation treatment, or in some steps. It is preferable to conduct the ultrasonic treatment during the course of impregnation treatment because the eggs can be more smoothly impregnated with the vitamin C-containing liquid component. The microwave irradiation treatment may be conducted for the purpose of, for example, warming the raw eggs in a raw state, heat insulation by avoiding lowering of temperature owning to removal of latent heat when the moisture is vaporized under vacuum, cooking, or sterilization.

In the method of preparing vitamin C-containing eggs, the eggs can be impregnated with the liquid component that contains, in addition to the vitamin C component, various kinds of food additive components, so that not only impregnation with the vitamin C component but also flavoring, improvement of flavor and eating texture, sterilization and addition of medicinal components, nutritive components, colorants and other various additives can be attained.

According to the above method, the eggs can be impregnated with the vitamin C-containing liquid component in a very short period of time. Further, the impregnation treatment can be performed at normal temperature without heating or cooling, so that the raw eggs can be impregnated without losing a raw state.

The vitamin C-containing eggs of the invention are the eggs obtained by the above method of impregnation treatment for foods (the method of preparing vitamin C-containing eggs). These eggs contain vitamin C (L-ascorbic acid) or the derivative thereof in an amount of 1 to 3,000 mg, preferably 1 to 2,500 mg per 100 g of edible egg portions (excluding the eggshells).

The vitamin C-containing eggs obtained in the invention satisfactorily contain the vitamin C component usually in both the edible yolk portion and the edible albumen portion. Also, when the impregnating vitamin C component is an ascorbic acid metallic salt, such as sodium ascorbate, the resulting vitamin C-containing eggs do not taste acid and have the same flavor and the same look as those of ordinary eggs. Therefore, the eggs can be used the same as ordinary eggs.

The above method of impregnation treatment for foods enables impregnating the unshelled eggs with the liquid component containing an alkali component, so that pidan-like eggs in which at least albumens are gelled like jellies and the albumens have transparency can be obtained. Described below is the method of impregnation treatment for foods comprising an impregnation step, in which the eggs are contacted with a liquid component containing an alkali component and thereby the edible egg portions are impregnated with the liquid component (otherwise referred to as the method of preparing pidan-like eggs hereinafter).

The pidan-like eggs dealt with in this specification are eggs in which at least albumens are gelled like jellies and the albumens have transparency. The albumens having transparency used in the specification comprehend all albumens having any transparency at all in comparison with albumens of ordinary boiled eggs that are completely whitened. That is, the albumens may be colorless and transparent or translucent ones, or colored and transparent or translucent ones.

The ingredient eggs for the method of preparing pidan-like eggs are selected from duck eggs, quail's eggs and chicken eggs, which are preferably unshelled.

Also, the ingredient eggs may be unheated eggs or heated eggs that have been heated to the extent of avoiding completion of gelation of albumens. In other words, the eggs preferably used in the method of preparing pidan-like eggs are the eggs in which the gelation of albumens has not been completed, such as the eggs in which the albumens are not gelled at all, or the eggs in which the albumens are incompletely gelled (e.g., so-called hot spring eggs). The eggs in which the albumens are completely gelled by heating, such as boiled eggs, are not preferable as the ingredient eggs for the method of preparing pidan-like eggs.

The liquid component containing an alkali component that is contacted with the eggs can be any type as long as containing an alkali component. However, it is ideal that the liquid component have a high pH value, such as 12 to 15, preferably 12.5 to 15, more preferably 13.5 to 14.5.

Examples of the alkali component that can be contained in the liquid component include sodium hydroxide, potassium hydroxide, aqueous ammonia, sodium phosphate, potassium phosphate and sodium carbonate. Examples of the liquid component include those prepared by dissolving or dispersing any of the above alkali components in an edible liquid, such as water, alcohol-containing water, edible oils, seasoning liquids, liquors and chelate liquids. Preferably, the liquid component is an aqueous solution containing at least one of the alkali components dissolved therein.

It is also preferable that the liquid component containing the alkali component further contain a food additive component other than the alkali component. Examples of the food additive component other than the alkali component include the same ones as exemplified above to be contained in the liquid components of the first and the third impregnation steps. When the food additive component is a liquid, the liquid may be used as a base of the liquid component.

It is preferable in the method of preparing pidan-like eggs that the liquid component contain salt or a coloring component, such as a black tea extraction component, as the food additive component other than the alkali component. It is preferable that the liquid component contain salt and the coloring component in addition to the alkali component because, in such a case, obtained are the pidan-like eggs that are similar to ordinary pidans in appearance, eating texture and flavor.

In the method of preparing pidan-like eggs, the eggs can be impregnated with the liquid component that contains, in addition to the alkali component, various kinds of food additive components, so that not only impregnation with the alkali component but also flavoring, improvement of flavor and eating texture, sterilization and addition of medicinal components, nutritive components, colorants and other various additives can be attained. It is sanitary to conduct the impregnation step because the liquid component containing the alkali component can effect sterilization on the egg surfaces.

The method of preparing pidan-like eggs comprises the impregnation step to impregnate the edible egg portions with the liquid component containing the alkali component by contacting the eggs with the liquid component.

To impregnate the eggs with the alkali component, any of the first impregnation step and the third impregnation step to impregnate the foods with the liquid component can be employed. Specifically, the impregnation step may be conducted such that the eggs are contacted with the liquid component containing the alkali component after the vacuum treatment or in the vacuum state, or such that the eggs are cooled in contact with the liquid component containing the alkali component.

Specifically, the above impregnation step of contacting the eggs with the liquid component containing the alkali component after the vacuum treatment or in the vacuum state is, for example, a step in which the eggs are vacuum treated and, in the maintained vacuum state, contacted with the liquid component containing the alkali component and thereafter subjected to pressurization, or a step in which the eggs are contacted with the liquid component containing the alkali component, vacuum treated and thereafter subjected to pressurization. Specific operations in the above impregnation steps are as described above.

The following are exemplary preferable impregnation steps of impregnating the eggs with the liquid component containing the alkali component by cooling the eggs in contact with the liquid component.

1. The raw eggs or the eggs that have been heated to the extent of avoiding completion of gelation of albumens are cooled by 5° C. or more, preferably 10° C. or more by soaking in the liquid component containing the alkali component to be impregnated in edible portions thereof with the liquid component, thereby the pidan-like eggs are prepared.

2. The raw eggs are soaked in the liquid component containing the alkali component, heated to the extent of avoiding completion of gelation of albumens and, as being soaked in the liquid component, cooled to be impregnated in edible portions thereof with the liquid component, thereby the pidan-like eggs are prepared. Preferably, the cooling is enough to cool the eggs to normal temperature or below.

In the impregnation step to impregnate the unshelled eggs with the liquid component containing the alkali component with cooling, the temperature difference in the cooling is preferably large for the same reason as in the above-noted case where the unshelled eggs are cooled in contact with the liquid component containing the vitamin C component. Ideally, the eggs are cooled by usually 5° C. or more, preferably 10° C. or more, still preferably 20° C. or more. It is also preferable to heat the eggs before the cooling. In the method of preparing pidan-like eggs with such a cooling method, it is preferable to perform pressurization for the eggs after the cooling because the eggs can be more effectively impregnated with the liquid component.

In the above impregnation step in the method of preparing pidan-like eggs, the impregnation degree with the alkali component can be adjusted by controlling the vacuum degree, the cooling degree or the like, thereby the eggs can be impregnated with a desired alkali-component content. The ideal amount of the liquid component in which the eggs are impregnated with in the impregnation step, although variable depending on the alkali-component concentration in the liquid component, is about 1 to 3,000 mg, preferably about 500 to 3,000 mg, more preferably about 500 to 2,500 mg per 100 g of edible egg portions. In the invention, the pidan-like eggs can be prepared with desired albumen transparency by controlling the alkali-component concentration in the liquid component used in the impregnation step, the amount of the impregnating liquid component or the like.

The method of preparing pidan-like eggs that comprises the above impregnation step allows for impregnating the eggs with the liquid component containing the alkali component in a very short period of time. Particularly, in the method comprising the impregnation step with the vacuum treatment, the impregnation treatment can be performed at normal temperature without heating or cooling, so that the raw eggs can be impregnated without losing a raw state after the impregnation treatment.

In the above impregnation steps, gases in air spaces of the eggs are substituted with the liquid component, so that the impregnated eggs sometimes gain weight. In such a case, the air volume in the eggshells has been reduced. Accordingly, when the eggs are heated after the impregnation step, it is frequent that the edible portions and the eggshells have an increased sticking degree, which results in difficult shelling of the eggs. Therefore, the eggs may be subjected to another vacuum treatment after the impregnation step in order to control a substantial increase of the egg weight.

The liquid component containing the alkali component that has remained after the impregnation step may be reused in another impregnation step for the untreated eggs.

In the case of preparing the pidan-like eggs as well, the impregnation treatment may be accompanied by a vibrating treatment, such as ultrasonic treatment, heating, heat insulation, cooling or a microwave irradiation treatment. These treatments may be performed in all the steps in the impregnation treatment, or in some steps.

It is preferable to conduct the ultrasonic treatment during the course of impregnation treatment because the eggs can be more smoothly impregnated with the alkali-component containing liquid component. The alkali component that has impregnated in the eggs reacts with the proteins in the eggs and neutralizes the amino acid, so that, after the impregnation step, the edible egg portions can have pH within the edible range. The microwave irradiation treatment may be conducted for the purpose of, for example, warming the raw eggs in a raw state, heat insulation by avoiding lowering of temperature owning to removal of latent heat when the moisture is vaporized under vacuum, cooking, or sterilization. The microwave irradiation treatment may be performed continuously over all the steps in the impregnation treatment, or in some steps. When the microwave irradiation treatment is conducted for the purpose of cooking, the treatment is ideally conducted after the impregnation is partially completed, more preferably in the latter half or after completion of the impregnation step.

In the method of preparing pidan-like eggs, production of the pidan-like eggs can be satisfactorily achieved even by leaving at rest the eggs that have been subjected to the above impregnation step because the proteins in the albumens are denatured by the alkali to form a transparent or translucent gel. However, production of the pidan-like eggs in which the albumens are a transparent or translucent gel can be made in a more reduced time by conducting a heat treatment.

Examples of the heat treatment include, likewise in making ordinary boiled eggs, soaking the eggs in a high-temperature liquid, such as hot water, after the impregnation step, irradiating the eggs with a microwave after the impregnation step, and steaming the eggs after the impregnation step. The heat treatment is conducted under conditions such that the albumens are gelled, or, ideally, such that the albumens are gelled and the yolks are soft boiled or hard boiled conditions as desired.

When the heat treatment is conducted by such a method as soaking the eggs in a high-temperature liquid, such as hot water, after the impregnation step, the high-temperature liquid may contain a food additive component other than the alkali component, so that the eggs can be impregnated with more food additive components.

According to the method of preparing pidan-like eggs, the pidan-like eggs in which the albumens are a transparent or translucent and, according to necessity, colored gel can be prepared readily and in a short period of time with good productivity. Also, according to the present invention, the pidan-like eggs in which the albumens have desired transparency, and the pidan-like eggs having a desired flavor and a desired color can be prepared.

The pidan-like eggs of the invention are obtained by the above method of preparing pidan-like eggs, and have albumens that are a transparent or translucent gel.

The pidan-like eggs of the invention in which the gelation of albumens has been completed can be impregnated, in a shelled state, with various components by being soaked in the liquid component containing the various components or by being well boiled in the liquid.

The pidan-like eggs obtained in the invention can be readily eaten without a treatment with mud, clay or lime components, which has been a problem with ordinary pidans. Moreover, the pidan-like eggs of the invention generate less waste products.

EXAMPLES

The present invention will be further illustrated with reference to the following examples, which is not to limit the scopes of the invention in any way.

Example 1

A lean meat portion of frozen tuna was cut into a piece of 100 mm×100 mm×15 mm to make a sample. The sample weight was 86.800 g. The sample was placed in a 300-ml beaker, and the beaker was set in an ultrasonic cleaning vessel. Then, the ultrasonic cleaning vessel was placed in a vacuum-pressure impregnating tank (produced by PLACERAM CO., LTD.). Subsequently, a vacuum (dry vacuum) was drawn to depressurize the vacuum-pressure impregnating tank to 2,000 Pa, and the vacuum drawing was continuously carried out for another 10 minutes. As a result, the pressure reached 100 Pa.

Then, the vacuum drawing was temporarily stopped, and rapeseed oil (NISSHIN CANOLA OIL, produced by THE NISSHIN OIL MILLS, LTD.) was poured in the beaker until the sample was completely soaked in the oil, and the ultrasonic cleaning vessel was operated at 25 W and 40 kHz. The pressure at this time had risen to about 1,000 Pa. Thereafter, the vacuum (wet vacuum) drawing was performed for 10 minutes, thereby the pressure reached 100 Pa. During the wet vacuum drawing, a large number of bubbles were confirmed to generate from the sample, which was the evidence that the moisture in the sample was being substituted with the impregnating oil.

After the vacuum drawing was terminated, the vacuum-pressure impregnating tank was purged with air and thereafter pressurized by introduction of compressed air. The tank was maintained at 0.8 MPa inside for 10 minutes and thereafter purged with air.

The sample was taken out of the tank and the beaker. The oil sitting on the sample surface was removed by a scraper, thereby lean tuna meat impregnated with rapeseed oil (A) was obtained. The lean tuna meat impregnated with rapeseed oil (A) was in a defrosted state and weighed 88.870 g. That is, the weight increase by 2.070 g (2.4%) was confirmed in comparison with the sample weight before the treatment.

The obtained lean tuna meat impregnated with rapeseed oil (A) was cut into bite-size pieces. Then, 13 panelists were asked to try and evaluate the lean tuna meat on the five items, which were appearance, flavor, eating texture, taste and total, based on the following criteria. The total point of all the items was collected from each of the panelists. The results of the evaluation based on the sum total point by the panelists (13 members) and the results of the evaluation of the untreated lean tuna meat (defrosted state) are shown in Table 1.

(Evaluation Criteria)
Very good: +5 points
Rather good: +3 points
Good and bad: 0 point
Rather bad: −3 points
Very bad: −5 points Example 2

Lean tuna meat impregnated with rapeseed oil (B) was obtained in the same manner as in Example 1, except that a lean meat portion of defrosted tuna (86.115 g), which had been defrosted from a frozen state at normal temperature, was used as a sample in place of the lean meat portion of frozen tuna. The obtained lean tuna meat impregnated with rapeseed oil (B) weighed 89.850 g, and the weight increase by 3.735 g (4.3%) was confirmed in comparison with the sample weight before the treatment. The lean tuna meat impregnated with rapeseed oil (B) was evaluated in the same manner as in Example 1. The results are shown in Table 1.

TABLE 1

|  | Example 1: Lean tuna meat impregnated with rapeseed oil (A) | Example 2: Lean tuna meat impregnated with rapeseed oil (B) | Untreated lean tuna meat |
|---|---|---|---|
| Evaluation Result (sum total point) | 33 | 62 | 13 |
| Evaluation Ranking | 2 | 1 | 3 |

As a result of the evaluation by tasting, the lean tuna meats impregnated with rapeseed oil obtained in Examples 1 and 2 were evaluated by many panelists that they were less dry and crumby, had resistance to the teeth and a favorable eating texture in comparison with the untreated lean tuna meat.

With these results, it was confirmed that the lean tuna meats impregnated with rapeseed oil obtained in Examples 1 and 2 had a uniform appearance on the cut surface and had been favorably impregnated with rapeseed oil. Also, the lean tuna meats impregnated with rapeseed oil obtained in Examples 1 and 2 had been improved in flavor in comparison with the untreated lean tuna meat and were thus suitable for eating.

Further, the results of Example 1 and Example 2 proved that any of the frozen and defrosted foods can be satisfactorily impregnated with the liquid component and that the defrosted foods can have a higher impregnation degree than that of the frozen foods when treated under the same conditions.

Example 3

A poly net was laid on a bottom of a 4-litter glass beaker, and, thereon, raw beef that weighed 204.369 g (a round-meat block, 60 mm×60 mm×60 mm, refrigerated at 6° C.) was placed. Then, the glass beaker was set in the same vacuum-pressure impregnating tank as used in Example 1.

Subsequently, the vacuum (dry vacuum) drawing was carried out to depressurize the vacuum-pressure impregnating tank to 850 Pa, and the vacuum drawing was continuously carried out for another 10 minutes. As a result, it was confirmed that a liquid had oozed on the surface of the sample raw beef. Next, milk (condensed type, MEIRAN ASPER MILK) was poured in the beaker until the sample raw beef was completely soaked in the milk, and the vacuum (wet vacuum) drawing was further conducted for 10 minutes.

After the vacuum drawing was terminated, the vacuum-pressure impregnating tank was purged with air and thereafter pressurized by introduction of compressed air. The tank was maintained at 0.6 MPa inside for 10 minutes and thereafter purged with air.

The sample was taken out of the beaker, and the milk sitting on the sample surface was removed by a scraper, thereby raw beef impregnated with milk was obtained. The obtained raw beef impregnated with milk weighed 209.266 g. That is, the weight increase by 4.897 g (2.4%) was confirmed in comparison with the sample weight before the treatment. The obtained raw beef impregnated with milk had been changed in color due to the overall impregnation with milk. With that, it was confirmed that the impregnation had been favorably effected deeply into the inside.

Example 4

Raw radish was peeled by a thickness of about 1 mm and cut into round slices and fan-shaped pieces, thereby samples were prepared with shapes shown in Table 2. A poly net was laid on a bottom of a 4-litter glass beaker, and, thereon, the samples were placed. Then, the glass beaker was set in the same vacuum-pressure impregnating tank as used in Example 1.

Subsequently, the vacuum (dry vacuum) drawing was performed to depressurize the vacuum-pressure impregnating tank to 1,000 Pa, and the vacuum drawing was continuously carried out for another 10 minutes. Then, a kimchi-flavored light-pickling base liquid (produced by EBARA FOODS INDUSTRY CO., INC.) or a diluted soup base, which had been prepared by diluting a soup base (the one for boil-cooking, produced by MITSUKAN CO,. LTD.) with water in the proportion of 1:5 (soup base:water), was poured in the beaker until the samples were completely soaked therein. Then, the vacuum (wet vacuum) drawing was performed for 10 minutes. The kimchi-flavored light-pickling base liquid was comprised of a seasoning solution containing ground red-peppers and the like suspended therein.

Next, the vacuum-pressure impregnating tank was purged with air and thereafter pressurized by introduction of compressed air. The tank was maintained at 0.6 MPa inside for 10 minutes and thereafter purged with air.

The samples were taken out of the beaker, and the light-pickling base liquid or the diluted soup base sitting on the sample surfaces was removed by a scraper, thereby impregnated raw radish samples were obtained. The results of weight measurement thereof are shown in Table 2. Also, the states before and after the impregnation with the diluted soup base are shown in a picture of FIG. 1.

TABLE 2

| Shape of raw radish sample | Impregnating liquid type | Weight before impregnation (g) | Weight after impregnation (g) | Weight change (g) | Weight change rate (%) |
|---|---|---|---|---|---|
| Round slice | Light-pickling base liquid | 186.352 | 178.533 | −7.799 | −4.19 |
| Fan shape | Light-pickling base liquid | 204.804 | 194.311 | −10.493 | −5.12 |
| Round slice | Diluted soup base | 187.555 | 186.724 | −0.831 | −0.44 |
| Fan shape | Diluted soup base | 192.225 | 192.023 | −0.202 | −0.11 |

In this Example, although the weight decrease was observed after the impregnation, it was well confirmed that all the samples had been impregnated with the light-pickling base liquid or the diluted soup base almost evenly into the inside.

Example 5

Raw eggs (chicken eggs with white eggshell), whose weight are shown in Table 3, were used as samples. The samples were placed in a 2000-ml glass beaker, and, thereon as a weight, a metal net was laid. The beaker was set in the same vacuum-pressure impregnating tank as used in Example 1.

Subsequently, the vacuum (dry vacuum) drawing was performed to depressurize the vacuum-pressure impregnating tank to 1,300 Pa, and the vacuum drawing was further carried out for another 10 minutes.

Then, soy sauce (undiluted, Kikkoman Soy Sauce produced by KIKKOMAN CORPORATION) was poured in the beaker until the samples were completely soaked therein, and the vacuum (wet vacuum) drawing was further conducted for 10 minutes.

Next, the vacuum-pressure impregnating tank was purged with air and thereafter pressurized by introduction of compressed air. The tank was maintained at 0.6 MPa inside for 10 minutes and thereafter purged with air.

Figure 2:
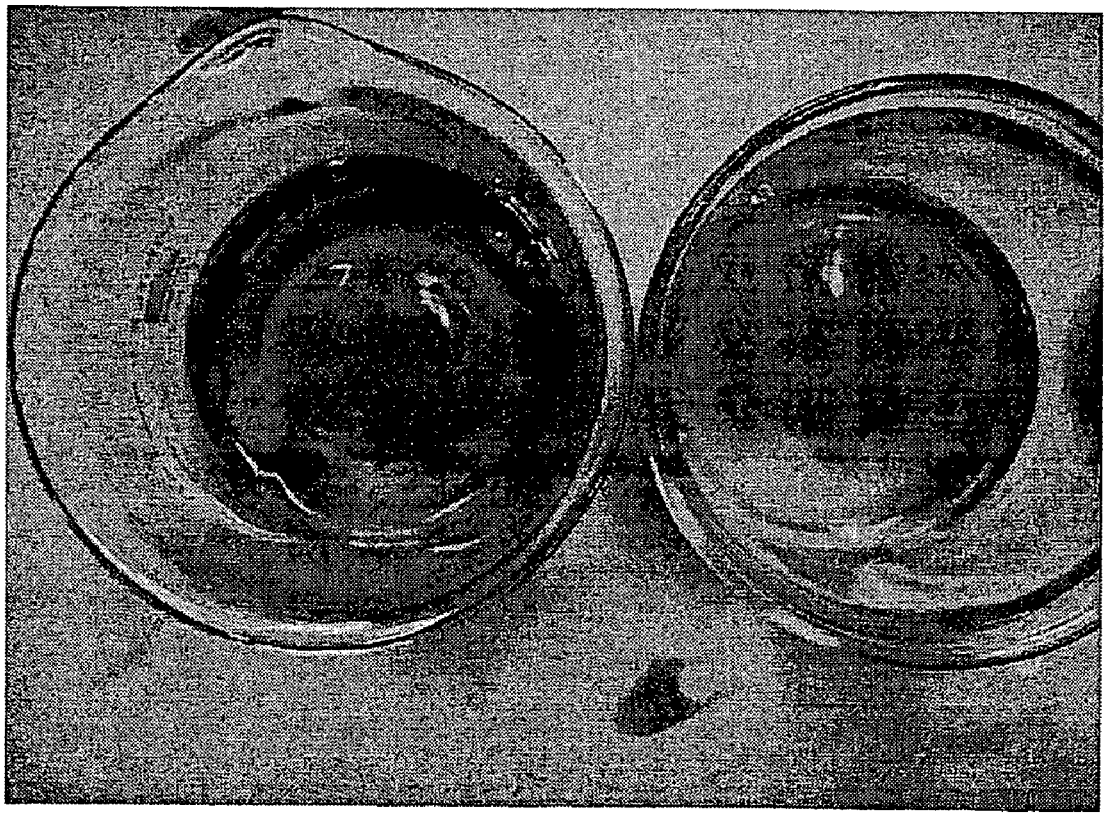
FIG. 2 is a picture of raw eggs (broken state), showing the states before and after impregnation with soy sauce (an impregnated egg on the left) according to Example 5.

The samples were taken out of the beaker and were lightly washed with water to remove the soy sauce sitting on the sample surfaces, thereby raw eggs impregnated with soy sauce were obtained. The obtained raw eggs impregnated with soy sauce had a light coffee color on the eggshell surface due to the effect of the impregnation with soy sauce. Breaking of the eggs revealed that they had the same light coffee color on the inner side of eggshell as well. Also, as shown in FIG. 2, the raw eggs itself (albumens and yolks) resulting from the breaking had took on a brown color in comparison with eggs unimpregnated with soy sauce. When tasted, these eggs had a soy sauce flavor. With that, it was confirmed that the eggs had been impregnated with soy sauce into the inside. The results of weight measurement thereof are shown in Table 3.

TABLE 3

| Sample raw egg | Weight before impregnation (g) | Weight after impregnation (g) | Weight change (g) | Weight change rate (%) |
|---|---|---|---|---|
| 1 | 66.523 | 67.565 | 1.042 | 1.566 |
| 2 | 68.370 | 69.379 | 1.009 | 1.476 |
| 3 | 64.877 | 65.829 | 0.952 | 1.467 |

When the obtained raw eggs impregnated with soy sauce were boiled, the resulting boiled eggs had taken on a coffee color in the albumens and had a soy sauce flavor.

Example 6

The impregnation treatment with soy sauce was conducted in the same manner as in Example 5, except that the boiled eggs prepared under the condition of a boiling time of 10 minutes were used in place of the raw eggs, thereby boiled eggs impregnated with soy sauce were obtained.

The obtained boiled eggs impregnated with soy sauce had a light coffee color on the eggshell surface due to the effect of the impregnation with soy sauce. Breaking and cutting of the eggs revealed that the albumens also had the same light coffee color and the yolks had a weak brown color. When tasted, these eggs had a soy sauce flavor. With that, it was confirmed that the eggs had been impregnated with soy sauce into the inside.

Example 7

The impregnation treatment with soy sauce was conducted in the same manner as in Example 5, except that peeled raw potato was used as a sample in place of the raw eggs, thereby raw potato impregnated with soy sauce was obtained.

Figure 3:
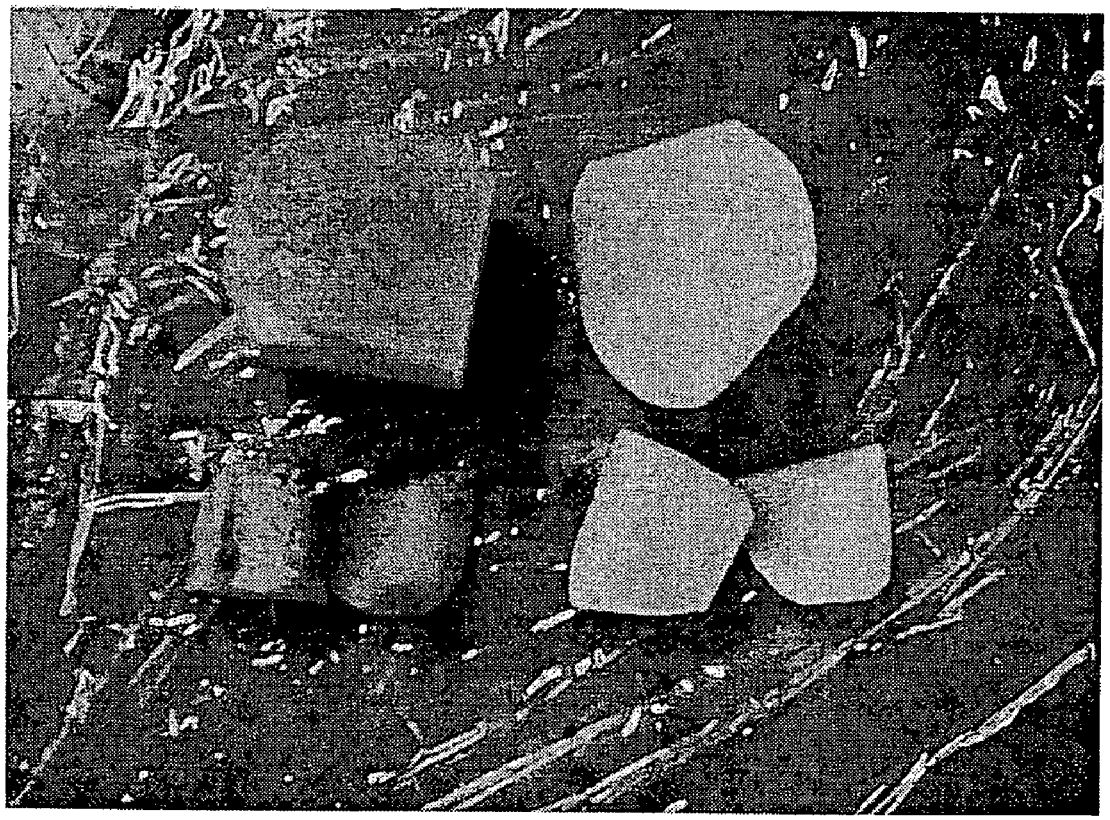
FIG. 3 is a sectional picture of pieces of raw potato used as samples in Example 7 and pieces of raw potato impregnated with soy sauce in Example 7 (impregnated pieces on the left)

The obtained raw potato impregnated with soy sauce had taken on a coffee color on the surface due to the effect of the impregnation with soy sauce. When the potato was cut and observed, the whole section had a coffee color, as shown in FIG. 3. With that, it was confirmed that the potato had been almost evenly impregnated with soy sauce into the center part. When tasted, the potato was confirmed to have a soy sauce flavor even in the inside.

Further, the raw potato impregnated with soy sauce was cooked by heating in a microwave oven at 500 W for 2 minutes, thereby cooked potato impregnated with soy sauce was obtained. Tasting of the cooked potato revealed that the potato had a uniform soy sauce flavor in every part.

Example 8

An unshelled white raw egg was used as a sample. The sample was placed in a vacuum-pressure impregnating tank (produced by PLACERAM CO., LTD.) at normal temperature. Subsequently, the vacuum (dry vacuum) drawing was performed to depressurize the vacuum-pressure impregnating tank to 700 Pa, and the vacuum drawing was continuously carried out for another 10 minutes. As a result, the pressure reached 100 Pa.

Then, the vacuum drawing was temporarily stopped, and a 9-wt % sodium ascorbate aqueous solution was poured in the tank until the sample was completely soaked therein. The pressure in the tank at this time was 700 Pa or below. Then, compressed air was introduced in the tank with the sample in a soaked state, and the tank was maintained at $4.9 \times 10^5$ Pa (0.49 MPa) inside for 10 minutes. Thereafter, the aqueous solution was discharged from the tank by applying a low pressure with air. The tank was then purged with air, thereby a vitamin C-containing egg (a1) was obtained.

When the obtained vitamin C-containing egg (a1) was broken, the inside state visually observed was the same as that of an ordinary raw egg. The amount of total vitamin C (ascorbic acid and derivatives thereof) in the edible portions (all egg portions except the eggshell) of the vitamin C-containing egg (a1) was 140 mg/100 g. The total vitamin C content (the sum of vitamin C and derivatives thereof) was determined by a high performance liquid chromatography.

Example 9

Vitamin C-containing eggs (a2) and (a3) obtained in the same manner as in Example 8 were soaked in water and then heated. After maintained in boiling for 10 minutes, the eggs were cooled, thereby vitamin C-containing boiled eggs were obtained.

The obtained vitamin C-containing boiled egg (a2) had a total vitamin C content in the edible egg portions of 104 mg/100 g, and the vitamin C-containing boiled egg (a3) had a total vitamin C content in the entire egg portions including the eggshell of 98 mg/100 g.

Example 10

A vitamin C-containing egg (a4) obtained in the same manner as in Example 8 was heated on a fluorine-coated frying pan until both the yolk and the albumen were hardened, thereby a fried egg was prepared. The obtained vitamin C-containing fried egg (a4) had a total vitamin C content of 107 mg/100 g.

Example 11

A vitamin C-containing egg (b1) was obtained in the same manner as in Example 8, except that a 29-wt % sodium ascorbate aqueous solution was used as the sodium ascorbate aqueous solution.

When the obtained vitamin C-containing egg (b1) was broken, the inside state visually observed was the same as that of an ordinary raw egg. The amount of total vitamin C in the edible portions (all egg portions except the eggshell) of the vitamin C-containing egg (b1) was 433 mg/100 g.

Example 12

Vitamin C-containing eggs (b2), (b3) and (b4) obtained in the same manner as in Example 11 were soaked in water and heated. After maintained in boiling for 10 minutes, the eggs were cooled, thereby vitamin C-containing boiled eggs were obtained.

The obtained vitamin C-containing boiled egg (b2) had a total vitamin C content in the edible egg portions of 396 mg/100 g, the vitamin C-containing boiled egg (b3) had a total vitamin C content in the yolk of 117 mg/100 g and that in the albumen of 433 mg/100 g, and the vitamin C-containing boiled egg (b4) had a total vitamin C content in the entire egg portions including the eggshell of 272 mg/100 g.

Example 13

A vitamin C-containing egg (b5) obtained in the same manner as in Example 11 was heated on a fluorine-coated frying pan until both the yolk and the albumen were hardened, thereby a fried egg was prepared. The obtained vitamin C-containing fried egg (b5) had a total vitamin C content of 432 mg/100 g.

Example 14

A vitamin C-containing boiled egg (c1) was obtained in the same manner as in Example 11, except that a boiled egg (unshelled), which had been prepared by heating a white egg in water, maintaining it in boiling for 10 minutes and then cooling it to 5° C., was used in place of the white raw egg.

The amount of total vitamin C in the edible portions (all egg portions except the eggshell) of the vitamin C-containing boiled egg (c1) was 743 mg/100 g.

Example 15

An unshelled white raw egg (62.60 g; the weight inclusive of the eggshell) was used as a sample. The sample was placed in a vacuum-pressure impregnating tank (produced by PLACERAM CO., LTD.) at ordinary temperature. Subsequently, the vacuum (dry vacuum) drawing was performed to depressurize the vacuum-pressure impregnating tank to 700 Pa, and the vacuum drawing was continuously carried out for another 10 minutes. As a result, the pressure reached 100 Pa. The egg weight at this time was 62.31 g (the weight inclusive of the eggshell), which had changed in relation to the egg weight before the treatment by a weight change rate −0.47%.

Then, the vacuum drawing was temporarily stopped, and a 29-wt % sodium ascorbate aqueous solution was poured in the tank until the sample was completely soaked therein. The pressure in the tank at this time was 700 Pa or below. The tank was then purged with air to create an atmospheric pressure state in the tank. The egg weight at this time was 62.9 g, which had changed in relation to the egg weight before the treatment by a weight change rate of +0.47%.

Then, compressed air was introduced in the tank with the sample in a soaked state, and the tank was maintained at $4.9 \times 10^5$ Pa inside for 10 minutes. The egg weight at this time was 63.3 g, which had changed in relation to the egg weight before the treatment by a weight change rate of +1.06%.

Thereafter, the aqueous solution was discharged from the tank by applying a low pressure with air. The vacuum-pressure impregnating tank was then depressurized again to 700 Pa, and the vacuum drawing was continuously carried out for another 30 minutes. The vacuum drawing was then terminated, and the vacuum-pressure impregnating tank was purged with air, thereby a vitamin C-containing egg (d1) was obtained. The egg weight of the obtained vitamin C-containing egg (d1) was 62.5 g (the weight inclusive of the eggshell). The weight change rate in relation to the egg weight before the treatment was −0.11%, which is to say that the weight was almost the same before and after the treatment.

When the obtained vitamin C-containing egg (d1) was broken, the inside state visually observed was the same as that of an ordinary raw egg. The amount of total vitamin C in the edible portions (all egg portions except the eggshell) of the vitamin C-containing egg (d1) was 184 mg/100 g.

Example 16

A vitamin C-containing egg prepared in the same manner as in Example 15 was heated in water, maintained in boiling for 10 minutes and then cooled, thereby a vitamin C-containing boiled egg (d2) was obtained.

The obtained vitamin C-containing boiled egg (d2) had a yolk and an albumen completely hardened. The vitamin C-containing boiled egg (d2) had a total vitamin C content in the yolk of 109 mg/100 g and that in the albumen of 249 mg/100 g.

Example 17

A white raw egg was soaked in a 29-wt % sodium ascorbate aqueous solution of ordinary temperature, heated therein and maintained in boiling for 10 minutes. Thereafter, the egg was cooled to 5° C. in a state of being soaked in the sodium ascorbate aqueous solution, thereby a vitamin C-containing boiled egg (e) was obtained. The obtained vitamin C-containing boiled egg (e) had a yolk and an albumen completely hardened. The vitamin C-containing boiled egg (e) had a total vitamin C content in the yolk of 368 mg/100 g and that in the albumen of 1,200 mg/100 g.

Example 18

A white raw egg was soaked in water and heated therein to 50° C. The egg was then soaked in a 29-wt % sodium ascorbate aqueous solution of 5° C. for cooling and maintained therein for 10 minutes, thereby a vitamin C-containing egg (f) was obtained.

When the obtained vitamin C-containing egg (f) was broken, the inside state visually observed was the same as that of an ordinary raw egg. The amount of total vitamin C in the edible portions (all egg portions except the eggshell) of the vitamin C-containing egg (f) was 329 mg/100 g.

Example 19

A white raw egg was soaked in a 29-wt % sodium ascorbate aqueous solution of ordinary temperature, heated therein to 50° C. and maintained for 10 minutes. Thereafter, the egg was cooled to 5° C. in a state of being soaked in the sodium ascorbate aqueous solution and maintained for 10 minutes, thereby a vitamin C-containing egg (g) was obtained.

When the obtained vitamin C-containing egg (g) was broken, the inside state visually observed was the same as that of an ordinary raw egg. The amount of total vitamin C in the edible portions (all egg portions except the eggshell) of the vitamin C-containing egg (g) was 268 mg/100 g.

Example 20

An unshelled white raw chicken egg was used as a sample. The sample was placed in a vacuum-pressure impregnating tank (produced by PLACERAM CO., LTD.) at ordinary temperature. Subsequently, a vacuum (dry vacuum) was drawn to depressurize the vacuum-pressure impregnating tank to 700 Pa, and the vacuum drawing was continuously carried out for another 10 minutes. As a result, the pressure reached 100 Pa.

Then, the vacuum drawing was temporarily stopped, and a 4-wt % sodium hydroxide aqueous solution (pH: 14.0) was poured in the tank until the sample was completely soaked therein. The pressure in the tank at this time was 700 Pa or below. Then, compressed air was introduced in the tank with the sample in a soaked state, and the tank was maintained at $4.9 \times 10^5$ Pa (0.49 MPa) inside for 10 minutes. Thereafter, the aqueous solution was discharged from the tank by applying a low pressure with air, thereby an egg impregnated with the sodium hydroxide aqueous solution was obtained.

The egg impregnated with the sodium hydroxide aqueous solution was soaked in water and heated therein. After maintained in boiling for 15 minutes, the egg was cooled with water, thereby a treated egg (a) was obtained. The treated egg (a) had an eggshell surface which had not been changed in color tone and which remained white.

The treated egg (a) was then shelled. The resulting appearance was compared with that of an ordinary boiled egg prepared by heat treating an untreated egg, which had not been impregnated with an alkali solution, in the same manner as with the egg impregnated with the sodium hydroxide aqueous solution.

The treated egg (a) thus obtained was gelled just like an ordinary boiled egg, and had a transparent albumen to show the inside yolk therethrough. With that, it was confirmed that a favorable pidan-like egg had been prepared.

Figure 4:
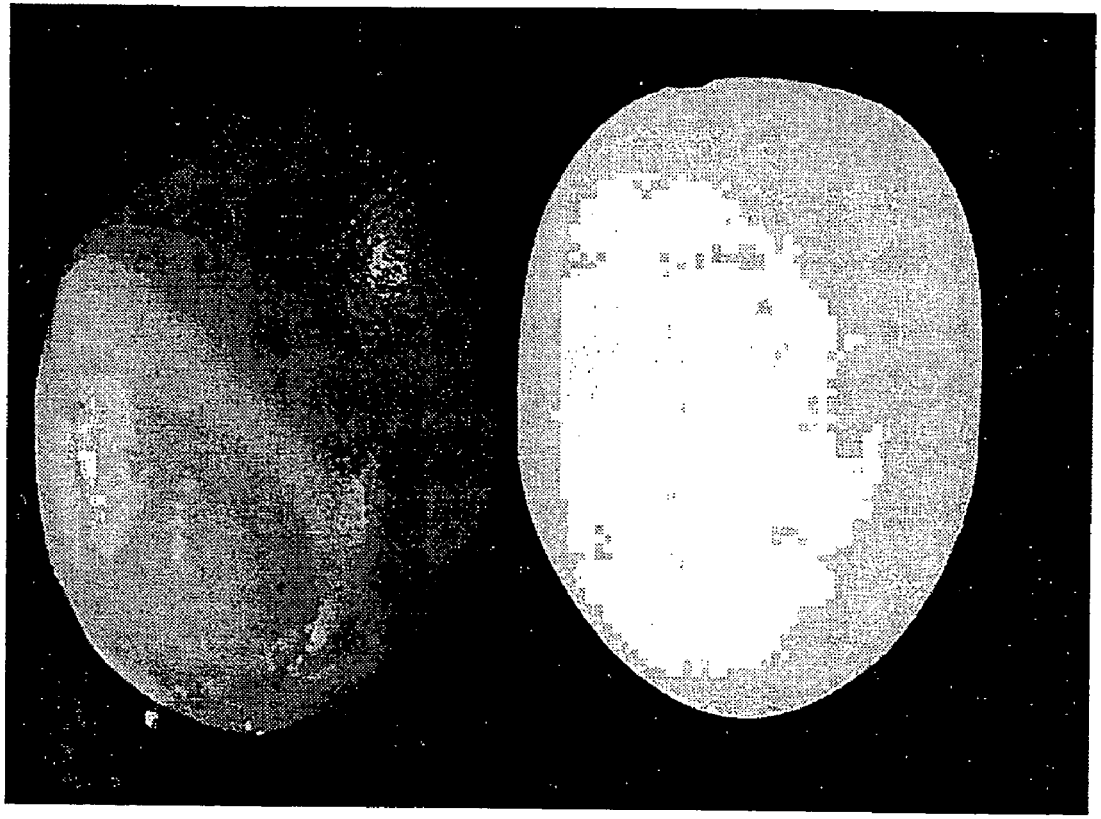
FIG. 4 is a picture of shelled eggs, one is a treated egg (a) obtained in Example 20 and the other is an ordinary boiled egg (the treated egg (a) on the left)
Figure 5:
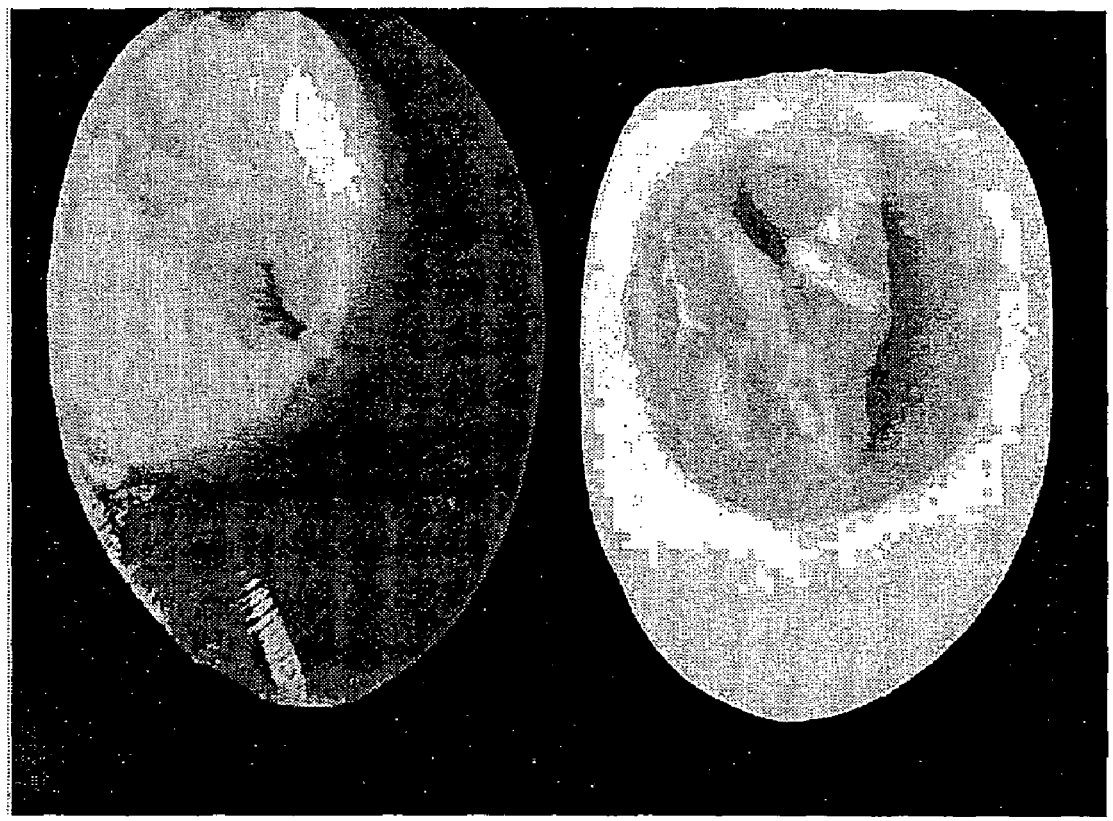
FIG. 5 is a picture showing cross sections of shelled and cut eggs, one is the treated egg (a) obtained in Example 20 and the other is an ordinary boiled egg (the treated egg (a) on the left)

FIG. 4 is a picture showing the shelled states of the treated egg (a) and an ordinary boiled egg. FIG. 5 is a picture showing the cross sections of the treated egg (a) and an ordinary boiled egg.

Example 21

A heat-treated egg (b) impregnated with aqueous ammonia was obtained in the same manner as in Example 20, except that a 15% ammonia aqueous solution (pH: 13.6) was used in place of the 4-wt % sodium hydroxide aqueous solution. The treated egg (b) had an eggshell surface which had not been changed in color tone and which remained white.

The treated egg (b) was then shelled. The resulting appearance was compared with that of an ordinary boiled egg prepared by heat treating an untreated egg, which had not been impregnated with an alkali solution, in the same manner as with the egg impregnated with the sodium hydroxide aqueous solution.

The treated egg (b) thus obtained was gelled just like an ordinary boiled egg, and had a translucent albumen to show the inside yolk therethrough. With that, it was confirmed that a favorable pidan-like egg had been prepared.

Figure 6:
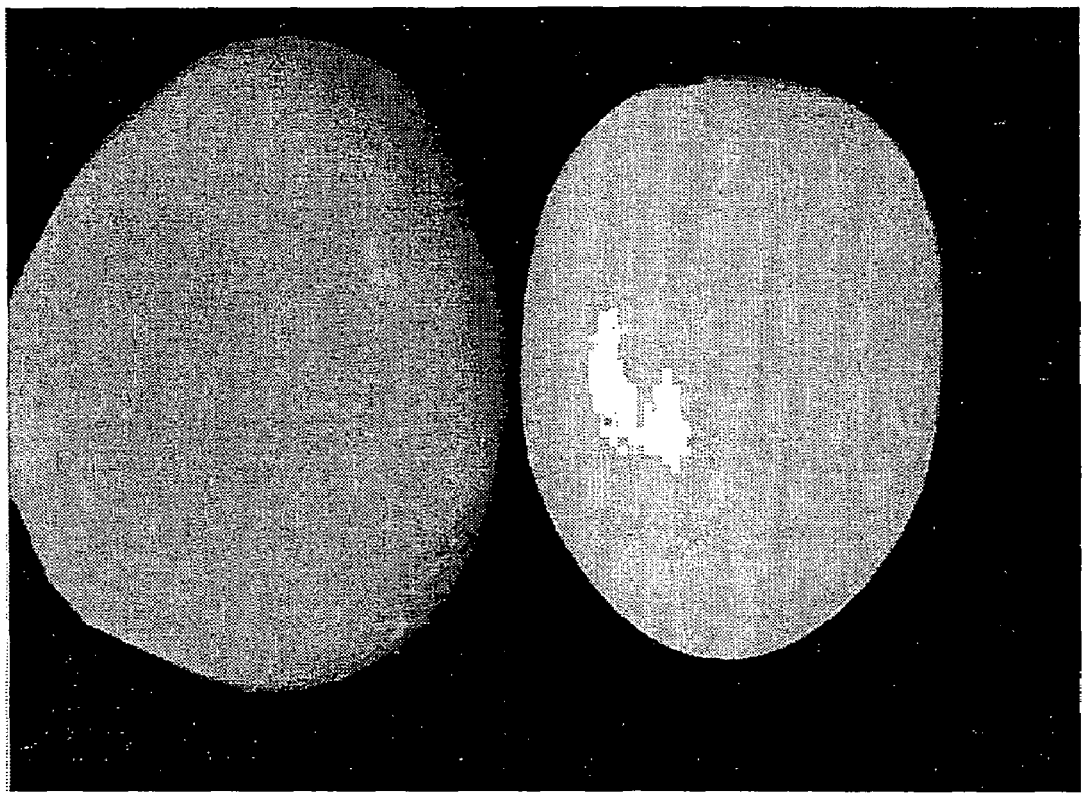
FIG. 6 is a picture of shelled eggs, one is a treated egg (b) obtained in Example 21 and the other is an ordinary boiled egg (the treated egg (b) on the left)
Figure 7:
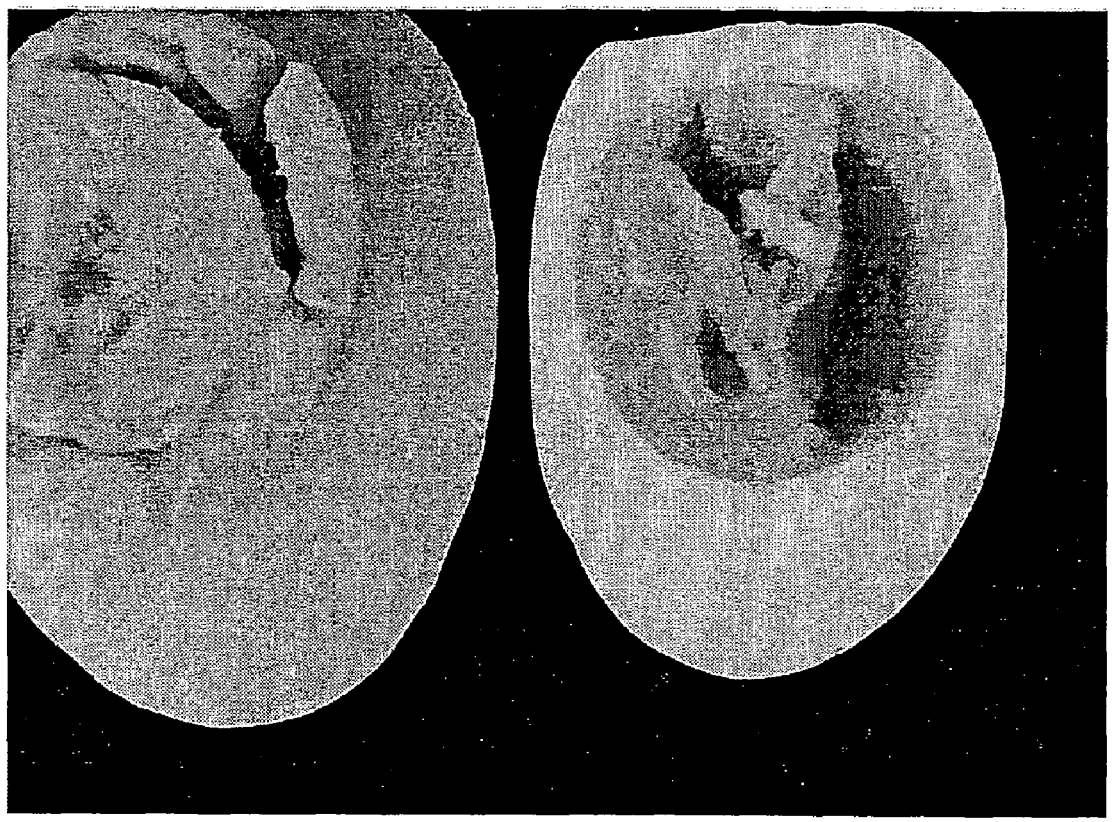
FIG. 7 is a picture showing cross sections of shelled and cut eggs, one is the treated egg (b) obtained in Example 21 and the other is an ordinary boiled egg (the treated egg (b) on the left)

FIG. 6 is a picture showing the shelled states of the treated egg (b) and an ordinary boiled egg. FIG. 7 is a picture showing the cross sections of the treated egg (b) and an ordinary boiled egg.

Example 22

An unshelled white raw chicken egg was used as a sample. The sample was soaked in hot water kept at 59° C. and maintained therein for 40 minutes for heating. When an egg that had been treated in the same manner as with the sample egg was observed for the egg state at this time, it was found that the egg was a so-called hot spring egg in which portion of the albumen was incompletely gelled.

Subsequently, the heated sample egg was soaked in a 15% sodium hydroxide aqueous solution (pH: 14.5) kept at 10° C. and left at rest therein for 5 hours, thereby an egg impregnated with the sodium hydroxide aqueous solution was obtained.

The obtained egg impregnated with the sodium hydroxide aqueous solution was then soaked in water of ordinary temperature, gradually heated to 90° C., maintained at 90° C. for 20 minutes and cooled with water, thereby a treated egg (c) was obtained. The treated egg (c) had an eggshell surface which had not been changed in color tone and which remained white.

The treated egg (c) was then shelled. The resulting appearance was compared with that of an egg obtained by heat treating an untreated egg, which had not been impregnated with an alkali solution, in the same manner as with the egg impregnated with the sodium hydroxide aqueous solution.

The treated egg (c) thus obtained was gelled just like an ordinary boiled egg, and had a translucent albumen to show the inside yolk therethrough. With that, it was confirmed that a favorable pidan-like egg had been prepared.

Figure 8:
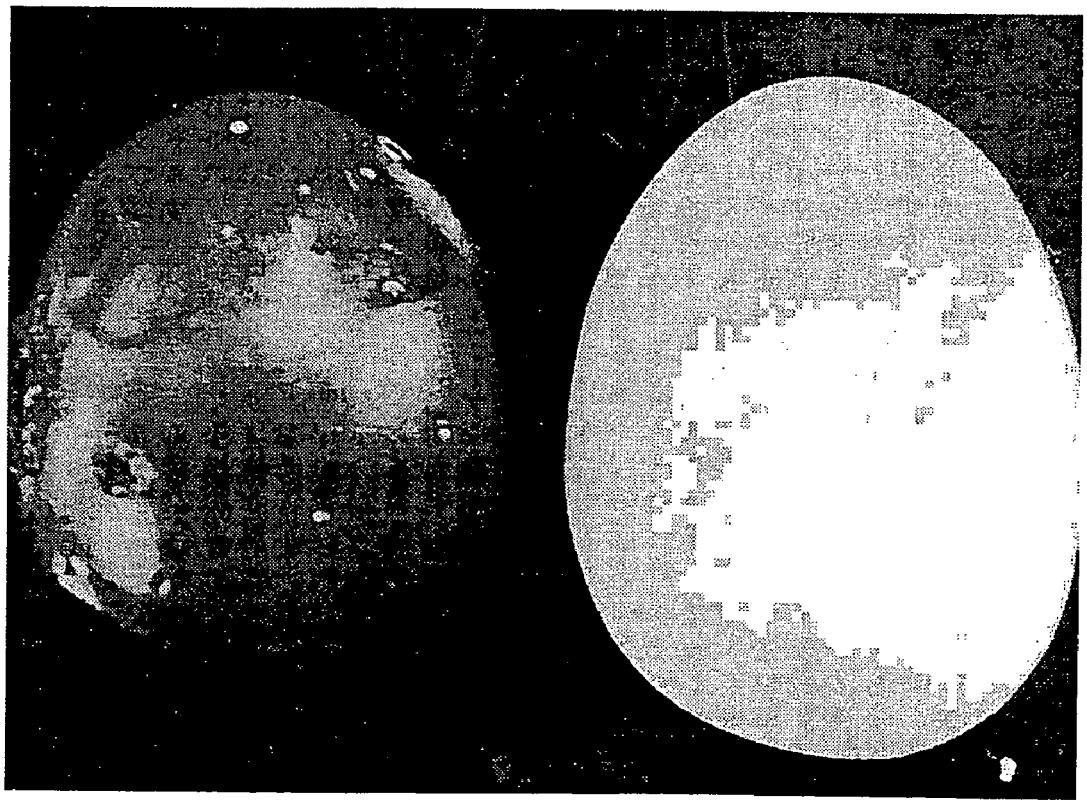
FIG. 8 is a picture of shelled eggs, one is a treated egg (c) obtained in Example 22 and the other is a likewise heat treated egg (the treated egg (c) on the left)
Figure 9:
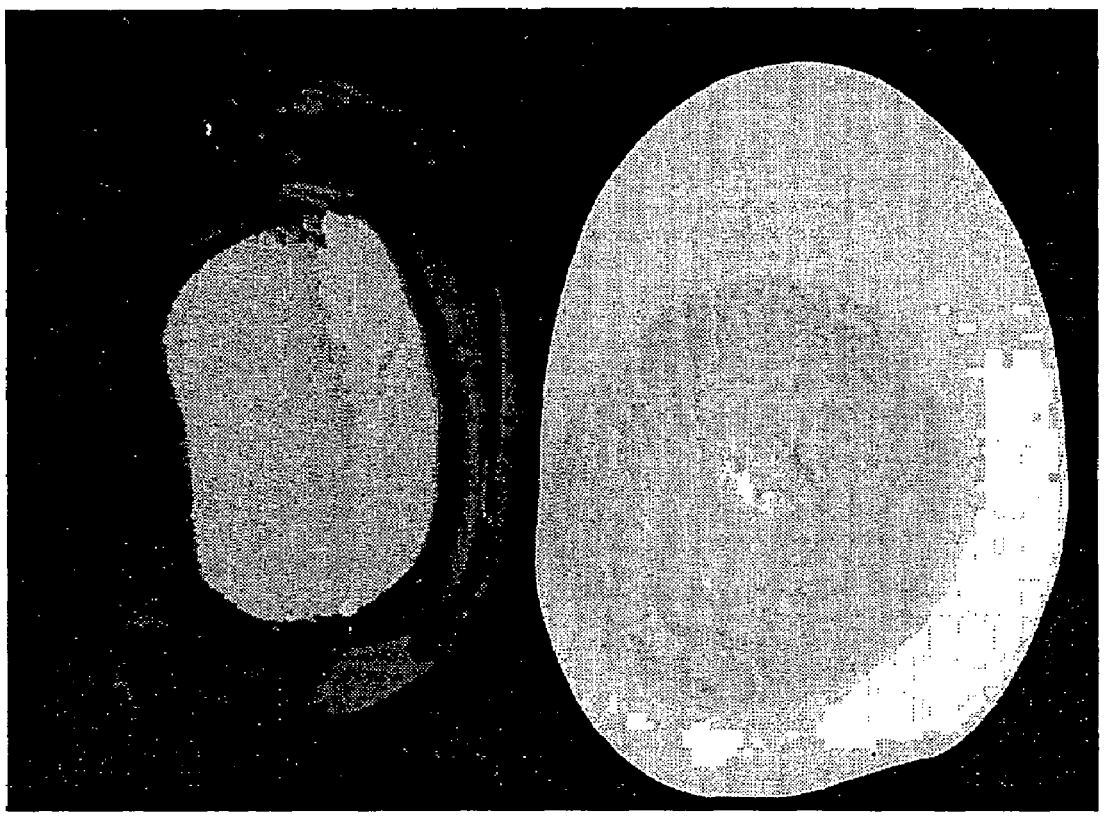
FIG. 9 is a picture showing cross sections of shelled and cut eggs, one is the treated egg (c) obtained in Example 22 and the other is a likewise heat treated egg (the treated egg (c) on the left)

FIG. 8 is a picture showing the shelled states of the treated egg (c) and an ordinary boiled egg. FIG. 9 is a picture showing the cross sections of the treated egg (c) and an ordinary boiled egg.

Example 23

An unshelled white raw chicken egg of ordinary temperature was used as a sample. The sample was soaked in a 15% sodium hydroxide aqueous solution (pH: 14.5) of ordinary temperature, cooled to 4° C. and left at rest therein at 4° C. for 18 hours, thereby an egg impregnated with the sodium hydroxide aqueous solution was obtained.

The obtained egg impregnated with the sodium hydroxide aqueous solution was then soaked in water of ordinary temperature, gradually heated to 90° C., maintained at 90° C. for 20 minutes and cooled with water, thereby a treated egg (d) was obtained. The treated egg (d) had an eggshell surface which had not been changed in color tone and which remained white.

The treated egg (d) was then shelled. The resulting appearance was compared with that of an egg obtained by heat treating an untreated egg, which had not been impregnated with an alkali solution, in the same manner as with the egg impregnated with the sodium hydroxide aqueous solution.

The treated egg (d) thus obtained was gelled just like an ordinary boiled egg, and had a translucent albumen to show the inside yolk therethrough. With that, it was confirmed that a favorable pidan-like egg had been prepared.

Figure 10:
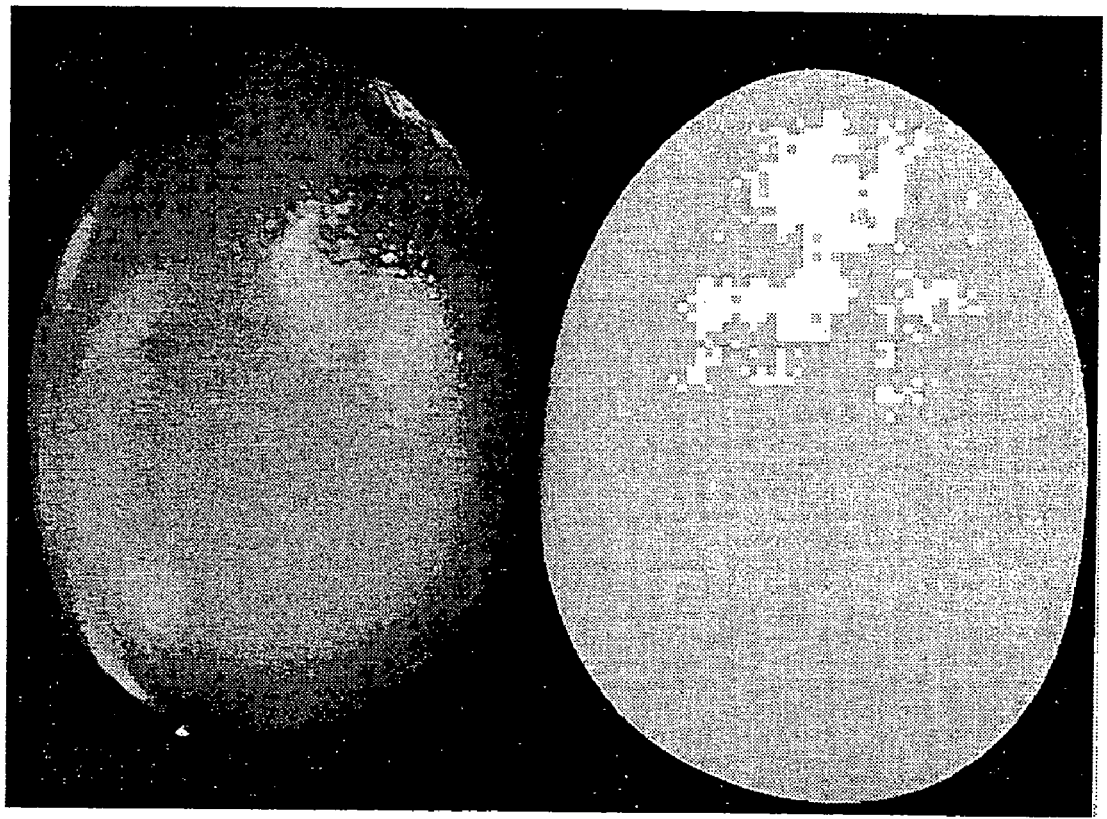
FIG. 10 is a picture of shelled eggs, one is a treated egg (d) obtained in Example 23 and the other is a likewise heat treated egg (the treated egg (d) on the left)
Figure 11:
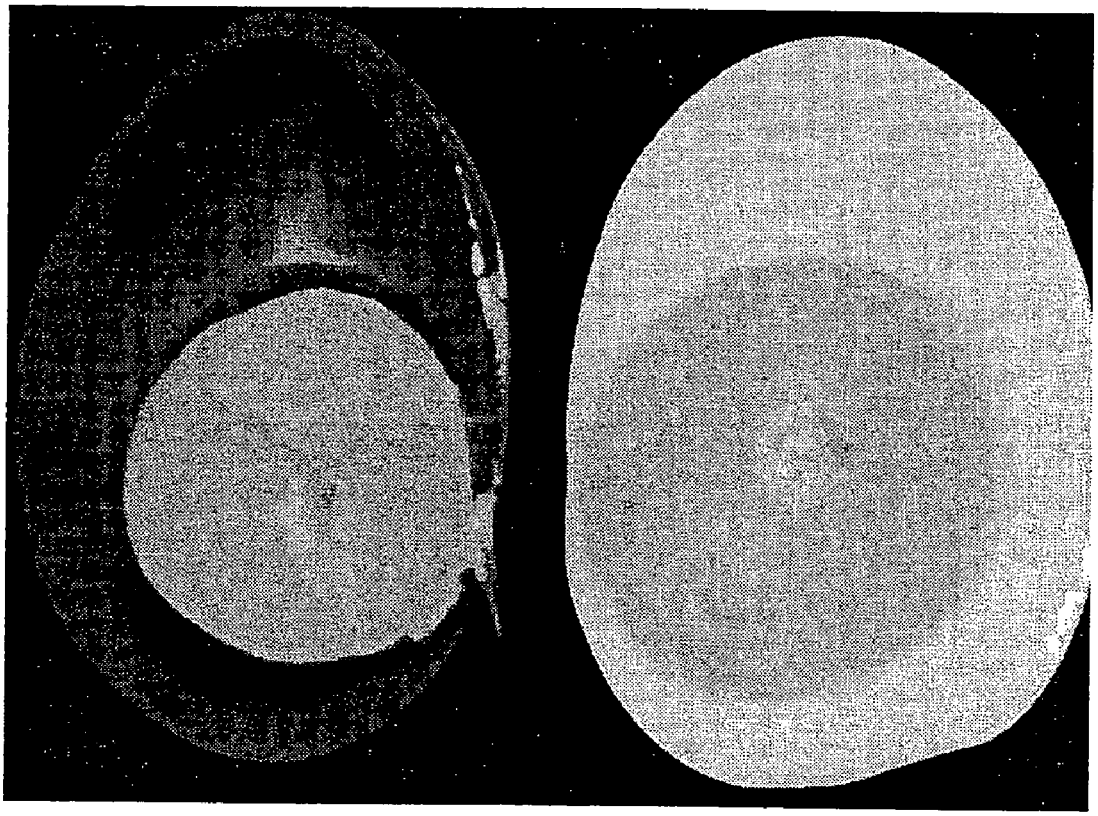
FIG. 11 is a picture showing cross sections of shelled and cut eggs, one is the treated egg (d) obtained in Example 23 and the other is a likewise heat treated egg (the treated egg (d) on the left).

FIG. 10 is a picture showing the shelled states of the treated egg (d) and an ordinary boiled egg. FIG. 11 is a picture showing the cross sections of the treated egg (d) and an ordinary boiled egg.

What is claimed is:

1. A method of impregnation treatment for foods comprising the steps of impregnating a food with one of a liquid component or a gas component by contacting the food with the liquid component or the gas component after one of a vacuum treatment or in a vacuum state wherein an ultrasonic treatment and microwave irradiation are performed during the impregnation treatment.

2. The method of impregnation treatment for foods as claimed in claim 1, wherein the impregnation step is a step in which the foods are vacuum treated, contacted with the liquid component in a maintained vacuum state and subjected to pressurization.

3. The method of impregnation treatment for foods as claimed in claim 1, wherein the impregnation step is a step in which the foods are contacted with the liquid component, vacuum treated and subjected to pressurization.

4. The method of impregnation treatment for foods as claimed in claim 1, wherein the impregnation step is a step in which the foods are vacuum treated and subjected to pressurization with the impregnating gas component.

5. The method of impregnation treatment for foods as claimed in claim 1, wherein the liquid component or the gas component contains a food additive component.

6. The method of impregnation treatment for foods as claimed in claim 1, wherein the pressure in the vacuum treatment or in the vacuum state ranges from 10 to 50,000 Pa.

7. The method of impregnation treatment for foods as claimed in claim 1, wherein the impregnation step is conducted under a temperature condition of −20 to 180.degree. C.

8. The method of impregnation treatment for foods as claimed in claim 1, wherein the impregnation step is conducted with the use of a vacuum impregnating apparatus or a vacuum-pressure impregnating apparatus.

9. The method of impregnation treatment for foods as claimed in claim 1, wherein a microwave irradiation treatment is performed during the impregnation treatment.

10. The method of impregnation treatment for foods as claimed in claim 1, wherein the foods are selected from among cereals, meats, fishes, eggs, vegetables, fruits and processed foods.

11. The method of impregnation treatment for foods as claimed in claim 10, wherein the foods are eggs.

12. The method of impregnation treatment for foods as claimed in claim 11, wherein the eggs are unshelled eggs.

13. The method of impregnation treatment for foods as claimed in claim 12, wherein the impregnation step is a step in which the eggs are contacted with a liquid component containing an alkali component to be impregnated in edible portions thereof with the liquid component.

14. The method of impregnation treatment for foods as claimed in claim 13, wherein the liquid component has pH of 12 to 15.

15. The method of impregnation treatment for foods as claimed in claim 13, wherein the liquid component contains an alkali component and a food additive component other than the alkali component.

16. The method of impregnation treatment for foods as claimed in claim 13, wherein the impregnation step is a step in which the eggs are impregnated with the liquid component in an amount of 1 to 3,000 mg per 100 g of edible egg portions.

17. The method of impregnation treatment for foods as claimed in claim 13, further comprising a heating step to heat the eggs after the impregnation step.

18. A pidan-like egg that has a transparent or translucent, gelled albumen, said pidan-like egg obtained by the method of impregnation treatment for foods as claimed in claim 13.

19. The method of impregnation treatment for foods as claimed in claim 11, wherein the impregnation step is a step in which the eggs are contacted with a liquid component containing vitamin C or a derivative thereof to be impregnated with the vitamin C or the derivative thereof in an amount of 1 to 3,000 mg per 100 g of edible egg portions.

20. The method of impregnation treatment for foods as claimed in claim 19, wherein the contact of the eggs with the liquid component containing vitamin C or a derivative thereof is conducted at −5 to 130° C.

21. The method of impregnation treatment for foods as claimed in claim 19, wherein the contact of the eggs with the liquid component containing vitamin C or a derivative thereof is conducted at 0 to 55° C.

22. The method of impregnation treatment for foods as claimed in claim 19, wherein the liquid component contains vitamin C or a derivative thereof, and other food additive component.

23. A vitamin C-containing egg obtained by the method of impregnation treatment for foods as claimed in claim 19.

24. The method of impregnation treatment for foods of claim 1, further comprising cooling the food in contact with the liquid component.

* * * * *

UNITED STATES PATENT AND TRADEMARK OFFICE
CERTIFICATE OF CORRECTION

| | | |
|---|---|---|
| PATENT NO. | : 7,833,557 B2 | Page 1 of 1 |
| APPLICATION NO. | : 11/599558 | |
| DATED | : November 16, 2010 | |
| INVENTOR(S) | : Kuwa et al. | |

It is certified that error appears in the above-identified patent and that said Letters Patent is hereby corrected as shown below:

Column 28, line 59, Claim 7, "–20 to 180.degree.C" should read -- –20 to 180°C --

Signed and Sealed this
Twenty-ninth Day of March, 2011

David J. Kappos
*Director of the United States Patent and Trademark Office*